US010057224B2

United States Patent
Oxford et al.

(10) Patent No.: US 10,057,224 B2
(45) Date of Patent: Aug. 21, 2018

(54) SYSTEM AND METHOD FOR INITIALIZING A SHARED SECRET SYSTEM

(71) Applicant: Rubicon Labs, Inc., San Francisco, CA (US)

(72) Inventors: William V. Oxford, Austin, TX (US); Roderick Schultz, San Francisco, CA (US); Gerald E. Woodcock, Austin, TX (US); Stephen E. Smith, Austin, TX (US); Alexander Usach, San Francisco, CA (US); Marcos Portnoi, Austin, TX (US)

(73) Assignee: Rubicon Labs, Inc., San Francisco, CA (US)

( * ) Notice: Subject to any disclaimer, the term of this patent is extended or adjusted under 35 U.S.C. 154(b) by 183 days.

(21) Appl. No.: 15/227,421

(22) Filed: Aug. 3, 2016

(65) Prior Publication Data

US 2017/0041302 A1    Feb. 9, 2017

Related U.S. Application Data

(60) Provisional application No. 62/200,942, filed on Aug. 4, 2015.

(51) Int. Cl.
*H04L 9/32* (2006.01)
*H04L 29/06* (2006.01)
*H04L 9/08* (2006.01)

(52) U.S. Cl.
CPC .............. *H04L 63/061* (2013.01); *H04L 9/08* (2013.01); *H04L 63/045* (2013.01); *H04L 63/0876* (2013.01)

(58) Field of Classification Search
CPC ....... H04L 63/061; H04L 63/045; H04L 9/08; H04L 63/0876
USPC ........................................................ 713/171
See application file for complete search history.

(56) References Cited

U.S. PATENT DOCUMENTS

| | | | | |
|---|---|---|---|---|
| 6,732,270 | B1 * | 5/2004 | Patzer | H04L 9/321 707/999.2 |
| 6,766,453 | B1 * | 7/2004 | Nessett | H04L 9/0844 455/410 |
| 8,316,237 | B1 * | 11/2012 | Felsher | H04L 9/0825 380/282 |
| 2009/0327737 | A1 * | 12/2009 | Hsu | H04L 9/3247 713/181 |
| 2015/0163058 | A1 * | 6/2015 | Hsu | H04L 9/3247 713/176 |
| 2018/0084412 | A1 * | 3/2018 | Alfred | H04L 63/0442 |

* cited by examiner

*Primary Examiner* — Teshome Hailu
(74) *Attorney, Agent, or Firm* — Sprinkle IP Law Group

(57) ABSTRACT

Embodiments as described herein provide systems and methods for sharing secrets between a device and another entity. The shared secret may be generated on the device as a derivative of a secret value contained on the device itself in a manner that will not expose the secret key on the device and may be sent to the entity. The shared secret may also be stored on the device such that it can be used in future secure operations on the device. In this manner, a device may be registered with an external service such that a variety of functionality may be securely accomplished, including, for example, the generation of authorization codes for the device by the external service based on the shared secret or the symmetric encryption of data between the external service and the device using the shared secret.

18 Claims, 13 Drawing Sheets

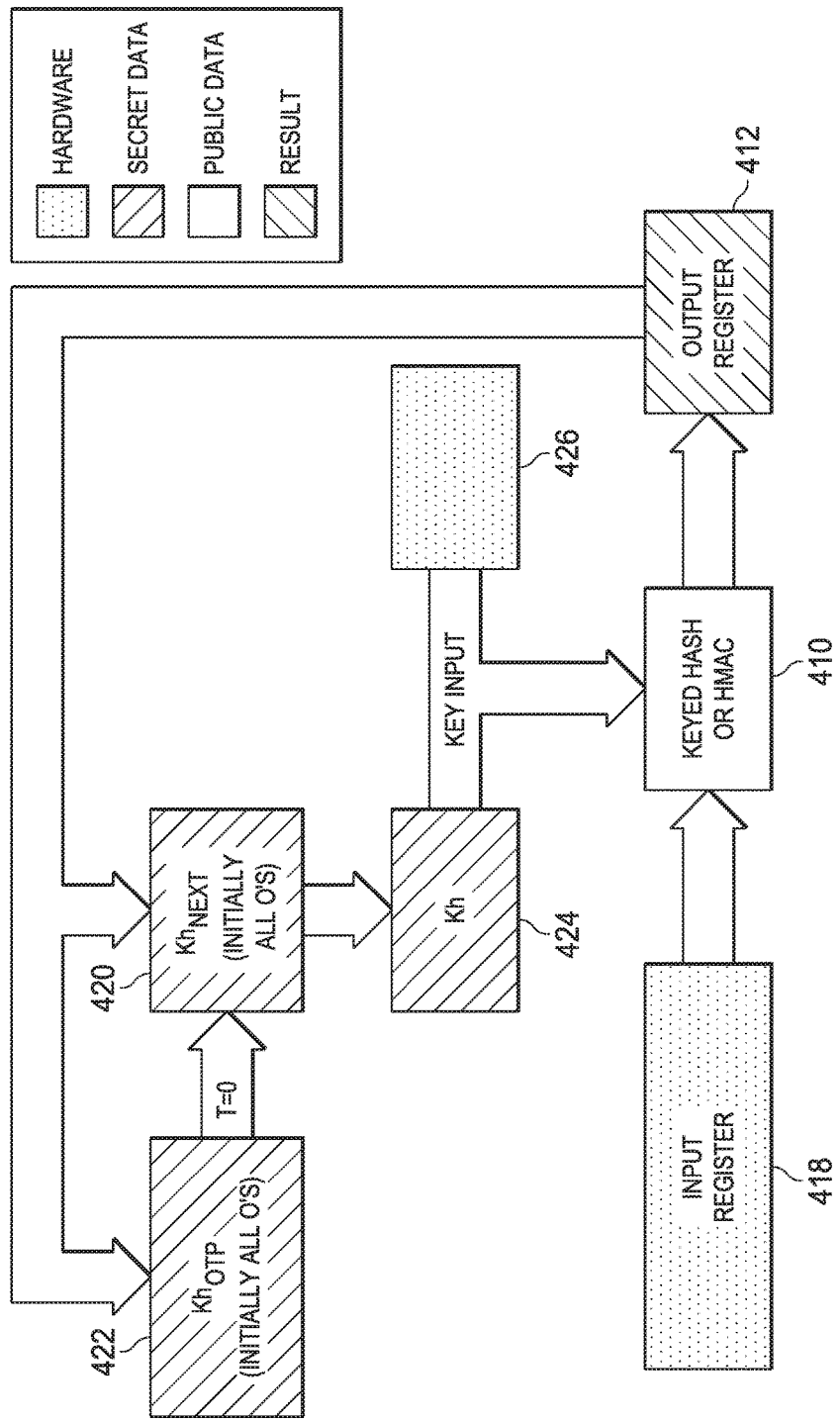

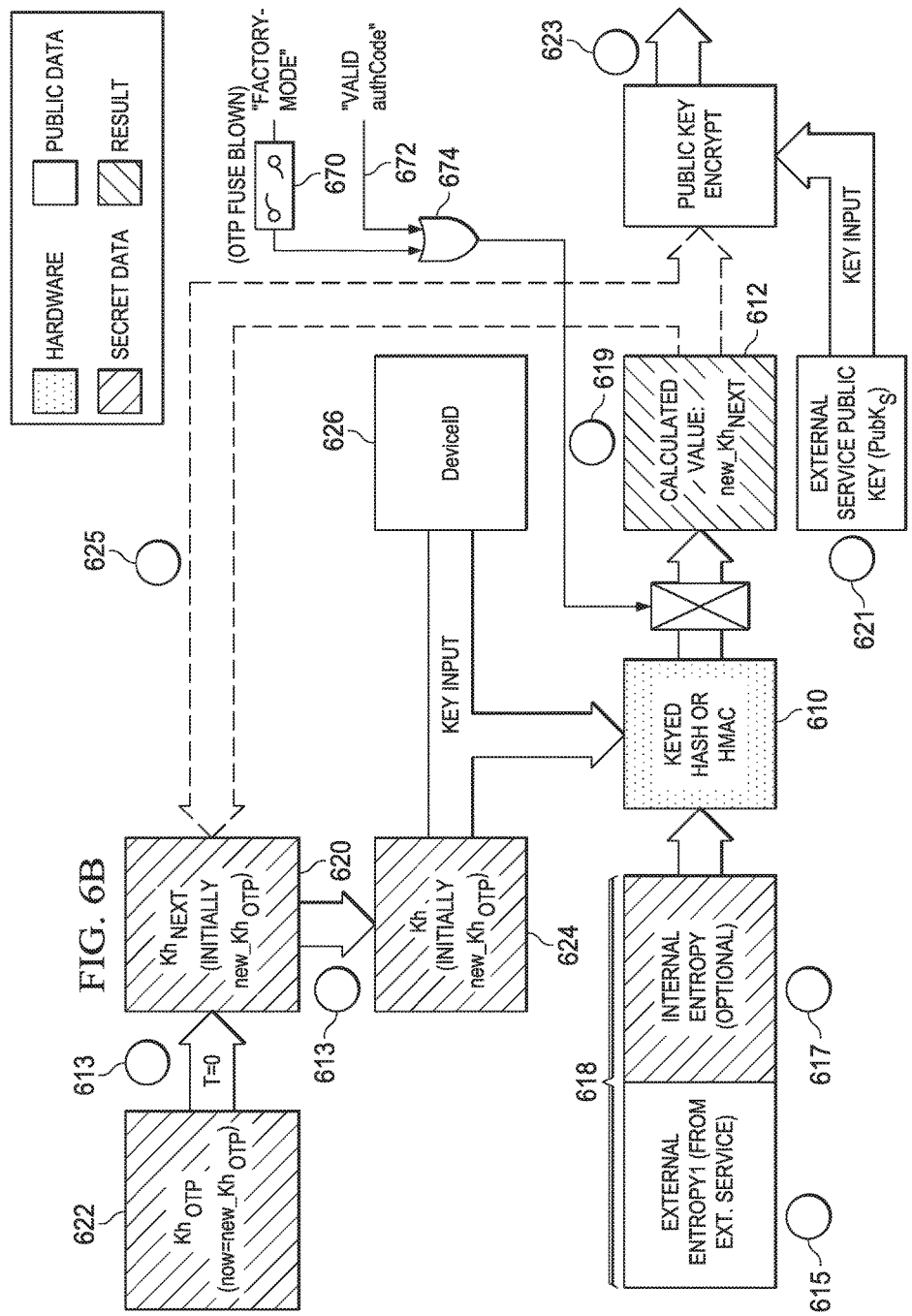

SYSTEM AND METHOD FOR INITIALIZING A SHARED SECRET SYSTEM

RELATED APPLICATIONS

This application claims a benefit of priority under 35 U.S.C. § 119 to United States Provisional Patent Application No. 62/200,942 filed Aug. 4, 2015, entitled "System and Method for Initializing a Recursively Authenticated Shared Secret System", by William V. Oxford et al., which is hereby fully incorporated by reference in its entirety.

TECHNICAL FIELD

This disclosure relates in general to security in computer systems. More specifically, this disclosure relates generally to using shared secret keys, including the use of such keys in data encryption. In particular, embodiments relate to efficient and secure initialization of a shared secret system.

BACKGROUND

There is a need for a simple and effective method to perform remote registration or activation in a secure manner for a connected device after it has been deployed in the field. For example, in a shared secret data system, the system has to initialize the shared secret in some manner. Moreover, derivatives of the shared secret may need to be created or utilized with the context of environments in which these connected devices are deployed and utilized.

While certain methodologies have been employed to share secrets between endpoints in the past, these methodologies have a whole host of disadvantages. One of the main disadvantages of almost all of these methodologies is the complexity of implementation. In addition to the complexity involved many of the methodologies employ the repeated use of asymmetric keys and exposure of the encrypted results. As such, the discovery of the private key of the asymmetric key pair is made more likely. Moreover, the use of asymmetric cryptography means that, by the very nature of asymmetric cryptography, at least one half of the key pair utilized (e.g., the public key) is not bound to a particular device or pair of devices.

What is desired then, are improved systems and methods that allow the ability to perform remote registration or sharing of secret data in a secure manner for a connected device after it has been deployed in the field including the creation and sharing of secret data between endpoints.

SUMMARY OF THE DISCLOSURE

To those ends, among others, embodiments as described herein may provide systems and methods for sharing secrets between a first device and another entity such as another device or an external service. The shared secret may be generated on the first device and may be sent to the entity as a derivative of a secret value contained on the first device in a manner that will not expose that first device's secret value. The shared secret may also be stored on the first device such that it can be used in future secure operations on the first device. In this manner, one device may be registered with another entity, such that a variety of functionality may be securely accomplished, including, for example, the generation of message authentication or authorization codes for the first device by the external entity, based on the shared secret or the symmetric encryption of data between the external entity and the first device using the shared secret or derivatives thereof.

In one embodiment, a system for registering a first device with an external entity using a shared secret includes a processor, a secure execution controller, an unreadable secret key register configured to store an immutable secret value, a volatile secret key register configured to be loaded with the immutable secret value when the device is reset and a keyed hash function. The secure execution controller may be configured to control or gate the use of the hash function or execution of (secure) operations that require the use the use of the value in the volatile secret key register.

A shared secret may be generated for an external entity and the first device (for example, using a secure operation) by providing input data as input to the first device's keyed hash function, the input data including data associated with an external entity, generating a shared secret associated with both the first device and the external entity by performing the hash function on the input data using the first device's secret value, or a derivative thereof, as a key to the hash function, encrypting the shared secret with a public key of the external entity, sending the encrypted shared secret to the external service and subsequently writing the shared secret to the first device's volatile secret key register.

In some embodiments, the derivative value comprises a combination of the secret value and an identifier of the device while the data associated with the external entity comprises an external entropy value. The external entropy value may also include the public key of the external service. In certain instances, the input data may also include an internal entropy value instead of or in addition to the externally-supplied values. This internal entropy value may or may not be visible to external observers.

In particular, embodiments, the first device's secret value may have been self-provisioned on the device by creating the secret value as a derivative of the device's immutable secret and writing the derived secret value into the secret key register on the device. This volatile secret value may have been created on the device by providing certain input data to the keyed hash function, this input data including external entropy and internal entropy values, generating the derived secret value by executing the hash function with the input data using a combination of an initial value of the secret key register and an identifier for the device as a key to the hash function; and writing the secret value to the unreadable secret key register such that the value in this secret key register may only be used as the input to the keyed hash function.

In some embodiments, the shared secret key may only be generated, based on an externally-supplied authorization code (or AuthCode) that enables the execution of the secure operation to generate the shared secret. This AuthCode may be specific to the combination of the first device and the external entity and it may be generated before the secret key value is written to the first device's volatile secret key register. Such an AuthCode may be generated by providing input data comprising a combination of the public key of the external entity and the code for the command (which may be a single bit command, a bit vector, processor executable code to implement the command, etc.) to generate a new secret value and generating the AuthCode associated with the device and the external service by executing the keyed hash function on this input data using a combination of the first device's secret value and the identifier for the first device as the key to the hash function.

In other embodiments, the secret value may be pre-provisioned on the first device. In certain of these embodiments, the first device's secure execution controller is configured to control the use of the output of the keyed hash function block based on the output of a logical gate function. The logical gate may have a first input from a "factory mode" register or function and a second input from a comparator that indicates the presence of a valid AuthCode (e.g., on a valid AuthCode line). Here, the shared secret may be generated based on either an AuthCode specific to the first device and the external entity or a "factory mode" input to the logical gate function that is supplied by way of an external signal. In the case where this external signal is disabled (for example if the external signal must pass through a fuseable link and that fuse has been blown), then the generation of the shared secret may be constrained to only be accomplished if the first device is in possession of a valid AuthCode.

Such an AuthCode may be generated by an external entity if that entity is in possession of the first device's secret value (either the immutable secret or the volatile secret). However, if the external entity is not in possession of either of the first device's secret values, then the valid AuthCode may be created by the first device itself as long as the factory mode register of function is still intact (i.e. if the fuse has not been blown). This way, the first device may produce a valid AuthCode for itself, which may be the output of a keyed hash function, the input data for which comprises a combination of the externally-supplied entropy (which may include the public key of the external entity) and the code (which may be a single bit, a bit vector, processor executable code to implement the command, etc.) for a command to generate a new secret value, and an optional internal entropy input (which may not be visible to external entities). This self-generated AuthCode will then be associated with both the first device and the external entity by using a combination of the first device's secret value and the identifier for the first device as the key to the hash function.

These and other aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 4 is a block diagram illustrating one embodiment of a portion of an architecture of a target device.

FIGS. 6A and 6B are block diagrams illustrating one embodiment of the use of a pre-provisioned secret of a target device.

DETAILED DESCRIPTION

The disclosure and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
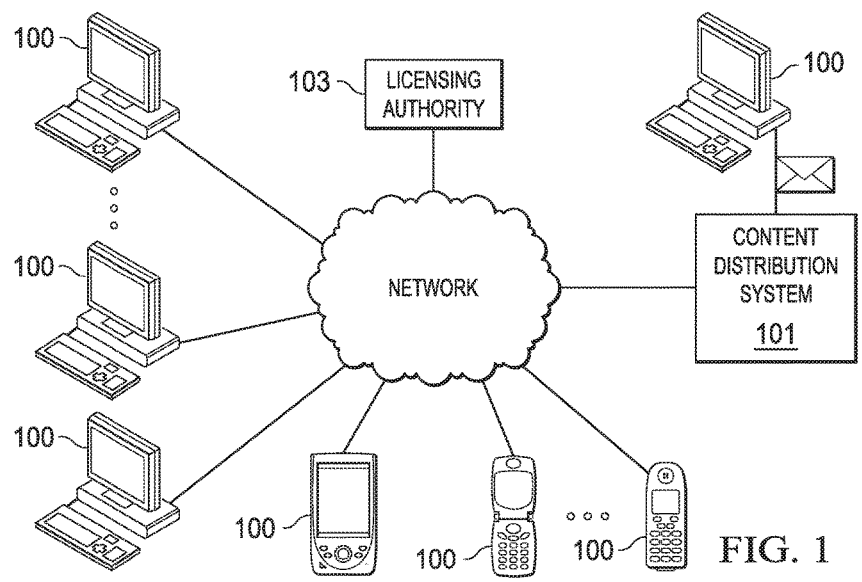
FIG. 1 is a block diagram illustrating one embodiment of an architecture for content distribution.

Before discussing embodiments in detail, it may be helpful to give a general overview of an environment in which embodiments as disclosed may be effectively utilized. FIG. 1 depicts one embodiment of such a topology. Here, a content distribution system 101 may operate to distribute digital content (which may be for example, a bitstream comprising audio or video data, a software application, etc.) to one or more target units 100 (also referred to herein also as target or endpoint devices) which comprise protocol engines. These target units may be part of, for example, computing devices on a wireline or wireless network or a computer device which is not networked, such computing devices including, for example, personal computers, cellular phones, personal data assistants, media players which may play content delivered as a bitstream over a network or on a computer readable storage media that may be delivered, for example, through the mail, etc. This digital content may be composed or distributed in such a manner such that control over the execution of the digital content may be controlled, and security implemented, with respect to the digital content (e.g., with respect to target devices 100).

In certain embodiments, control over the digital content may be exercised in conjunction with an external entity or licensing authority 103. This licensing authority 103 (which is one example of an external entity or external service and may be referred to interchangeably as a central licensing authority or CLA, though it will be understood that such a licensing authority need not be centralized and whose function may be distributed, or whose function may be accomplished by content distribution system 101, manual distribution of data on a hardware device such as a memory stick, etc.) may provide a key or authorization code (also referred to as an authcode or AuthCode). This AuthCode may be a compound key (DSn), that is both cryptographically dependent on the digital content distributed to the target device and bound to a particular target device (TDn). It will be noted that while the CLA is depicted distinctly from target devices 100, CLA may be a particular instance of a target device and may share the architecture of target device 100. Additionally, while depicted in the diagram as a single licensing authority, it will be noted that there may be multiple licensing authorities configured with a particular target device 100 and that these licensing authorities may be hierarchically configured or distributed, as discussed in more detail in U.S. patent application Ser. No. 14/497,652 titled "Systems and Methods for Establishing and Using Distributed Key Servers" filed on Sep. 26, 2014 by Oxford et al incorporated herein by reference in its entirety.

Figure 2:
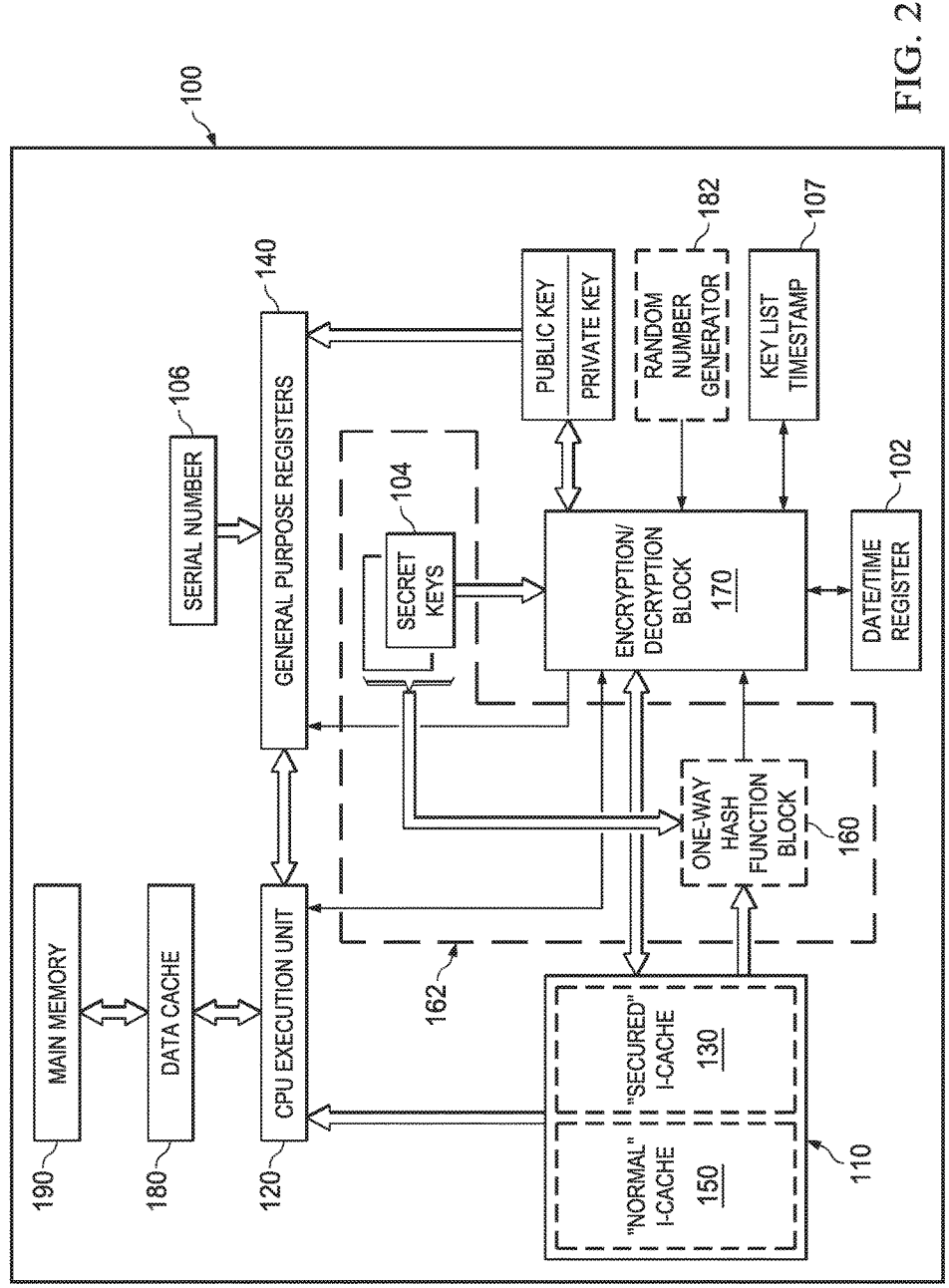
FIG. 2 is a block diagram illustrating one embodiment of a target device.

Before discussing the control over digital content in more detail it will now be helpful to discuss an embodiment of the architecture of a target device 100 in more detail. Moving then to FIG. 2, an architecture of one embodiment of a target device that is capable of controlling the execution of the digital content or implementing security protocols in conjunction with received digital content is depicted. Elements of the target unit 100 may include a set of blocks which allow a process to execute in a secured mode on the target device 100 such that when a process is executing in secured mode the working set of the process may be isolated. It will be noted that while certain of these blocks may be described as hardware in certain embodiments, software may be utilized to accomplish similar functionality with equal efficacy. For example, these blocks may be emulated hardware running as software on secure computing device, where the security of that device may be provided by the same security methods and systems as discussed herein or different security systems and methods entirely. It will also be noted that while certain embodiments may include all the blocks described herein other embodiments may utilize lesser or additional blocks.

The target device 100 may comprise a CPU execution unit 120 which may be a processor core with an execution unit and instruction pipeline. Clock or date/time register 102 may be a free-running timer that is capable of being set or reset by a secure interaction with a central server. Since the time may be established by conducting a query of a secure time standard, it may be convenient to have this function be on-chip. Another example of such a date/time register may be a register whose value does not necessarily increment in a monotonic manner, but whose value does not repeat very often. Such a register could be useful in the case where a unique timestamp value might be required for a particular reason, but that timestamp value could not necessarily be predicted ahead of time. Thus, a pseudo-random number generator may be a suitable mechanism for implementing such a register.

Other embodiments may include a hybrid register, where a part of the register value constitutes a set of pseudo-random bits whose value is coupled with another set of bits that reflect the local time and the thus-assembled register may be signed using a private key such that the device can be confident that none of the register bits have been modified in any way. This signature can be generated in several methods, but in one embodiment hash function 160 can be used with the assembled register field as the input and the resulting (derived) output as the signature, where the key input that is used is a private secret that can only be accessed (although possibly not ever known) by the device that is creating the signature of the assembled register data. Another embodiment of a manner by which this signature may be implemented is to use a non-keyed hash function to generate an output that is then encrypted with the private key, as mentioned above. Thus, only a device with the ability to use this private key will be able to verify the signature.

The output of hardware hash function 160 may be used in other manners to produce the current value of this register. In the case where the output of such a hash function is used as a seed or salt value for the input of the hash function block 160, the resulting output series may resemble a random number sequence statistically, but the values may nonetheless be deterministic, and thus, potentially predictable. Target unit 100 may also contain a true random number generator 182 which may be configured to produce a sequence of sufficiently random numbers or which can then be used to supply seed values for a pseudo-random number generation system. This pseudo-random number generator can also potentially be implemented in hardware, software or in "secure" software.

One-way hash function block 160 may be operable for implementing a hashing function substantially in hardware. One-way hash function block 160 may be a part of a secure execution controller 162 that may be used to control the placement of the target device 100 in secure mode or that may be used to control memory accesses (e.g., when the target device 100 is executing in secured mode) or for other purposes, as will be described in more detail herein at a later point. This one-way hash function block 160 may for example, provide a keyed hash function using one or more of secret keys 104 as an input cryptographic key. The input data or precursor for the hash function block may be provided from, for example, a memory location such as general purpose registers 140, data cache 180, main memory 190, random number generator 182, serial number register 106, or the like. A serial number may comprise, for example a silicon serial number permanently stored in one or more the silicon devices at a factory or a device serial number assigned when the device is assembled (e.g., by a system integrator).

In one embodiment, one-way hash function block 160 may be implemented in a virtual fashion, by a secure process running on the very same CPU that is used to evaluate whether a given process is secure or not. In certain embodiments, two conditions may be adhered to, ensuring that such a system may resolve correctly. First, the secure mode "evaluation" operation (e.g., the hash function) proceeds independently of the execution of the secure process that it is evaluating. Second, a chain of nested evaluations may have a definitive termination point (which may be referred to as the root of the "chain of trust" or simply the "root of trust"). In such embodiments, this "root of trust" may be the minimum portion of the system that should be implemented in some non-changeable fashion (e.g., in hardware). This minimum feature may be referred to as a "hardware root of trust". For example, in such embodiments, one such hardware root of trust might be a one-way hash function that is realized in firmware (e.g., in non-changeable software). This one-way hash function may also be a keyed hash function, where the value for the key input may not appear in the memory space of the process that is computing the hash function.

Another portion of the target unit 100 may be a hardware-assisted encryption/decryption block 170 (which may be referred to as the encryption system or block, the decryption system or block or the encryption/decryption block interchangeably), which may use either the target unit's 100 secret key(s) or public/private keys (described later) or a derivative thereof (as described earlier) to encrypt or decrypt data. This encryption/decryption block 170 can be implemented in a number of ways. It should also be noted that such a combination of a one-way hash Function and an optional subsequent encryption/decryption system may comprise a digital signature generator that can be used for the validation of any digital data, whether that data is distributed in encrypted or in plaintext form. The speed and the security of the protocol may vary depending on the construction of this block, so it may be configured to be both flexible enough to accommodate security system updates as well as fast enough to allow the system to perform real-time decryption and/or authentication or validation of time-critical messages.

It is not material to embodiments exactly which encryption or hashing algorithms are used for this encryption/decryption block (which may be configured to implement signature generation) 170. In order to promote the maximum flexibility, it is assumed that the actual implementation is general-purpose enough to be used in a non-algorithmically specific manner, but there are many different means by which this mechanism can be realized. It should be noted at this point that the terms encryption and decryption may be utilized interchangeably herein when referring to mechanisms (algorithms, hardware, software, etc.) for performing encryption/decryption. If symmetric encryption is used in certain embodiments, the same or similar encryption or decryption mechanism may be utilized for both encryption and decryption. In the case of an asymmetric mechanism, the encryption and decryption functions may or may not be substantially similar, even though the keys may be different.

Target device 100 may also comprise a data cache 180, an instruction cache 110 where code that is to be executed can be stored, and main memory 190. Data cache 180 may be almost any type of cache desired such as a L1 or L2 cache. In one embodiment, data cache 180 may be configured to associate a secure process descriptor with one or more pages of the cache and may have one or more security flags associated with (all or some subset of the) lines of a data cache 180. For example, a secure process descriptor may be associated with a page of data cache 180.

Generally, embodiments of target device 100 may isolate the working set of a process executing in secure mode that is stored in data cache 180 such that the data is inaccessible to any other process, even after the original process terminates. More specifically, in one embodiment, the entire working set of a currently executing secure process may be stored in data cache 180 and writes to main memory 190 and write-through of that cache (e.g., to main memory 190) disallowed (e.g., by secured execution controller 162) when executing in secured mode.

Additionally, for any of those lines of data cache 180 that are written to while executing in secure mode (e.g., a "dirty" cache line) those cache lines (or the page that comprises those cache lines) may be associated with a secure process descriptor for the currently executing process. The secure process descriptor may uniquely specify those associated "dirty" cache lines as belonging to the executing secure process, such that access to those cache lines can be restricted to only that process (e.g., be by secured execution controller 162).

In certain embodiments, in the event that the working set for a secure process overflows data cache 180 and portions of data cache 180 that include those dirty lines associated with the security descriptor of the currently executing process need to be written to main memory (e.g., a page swap or page out operation) external data transactions between the processor and the bus (e.g., an external memory bus) may be encrypted (e.g., using encryption block 170 or encryption software executing in secure mode). The encryption (and decryption) of data written to main memory may be controlled by secure execution controller 162. The key for such an encryption may be the secure process descriptor itself or some derivative thereof and that secure descriptor may itself be encrypted (e.g., using the target device's 100 secret key 104 or some derivative thereof) and stored in the main memory 190 in encrypted form as a part of the data being written to main memory.

Instruction cache 110 is typically known as an I-Cache. In some embodiments, a characteristic of portions of this I-Cache 110 is that the data contained within certain blocks be readable only by CPU execution unit 120. In other words, this particular block of I-Cache 130 is execute-only and may not be read from, nor written to, by any executing software. This block of I-Cache 130 will also be referred to as the "secured I-Cache" 130 herein. The manner by which code to be executed is stored in this secured I-Cache block 130 may be by way of another block which may or may not be depicted. Normal I-Cache 150 may be utilized to store code that is to be executed normally as is known in the art.

Additionally, in some embodiments, certain blocks may be used to accelerate the operation of a secure code block. Accordingly, a set of CPU registers 140 may be designated to only be accessible while the CPU 120 is executing secure code or which are cleared upon completion of execution of the secure code block (instructions in the secured I-Cache block 130 executing in secured mode), or if, for some reason a jump to any section of code which is located in the non-secure or "normal" I-Cache 150 or other area occurs during the execution of code stored in the secured I-Cache 130.

In one embodiment, CPU execution unit 120 may be configured to track which registers 140 are read from or written to while executing the code stored in secured I-Cache block 130 and then automatically clear or disable access to these registers upon exiting the "secured execution" mode. This allows the secured code to quickly "cleanup" after itself such that only data that is permitted to be shared between two kinds of code blocks is kept intact. Another possibility is that an author of code to be executed in the secured code block can explicitly identify which registers 140 are to be cleared or disabled. In the case where a secure code block is interrupted and then resumed, then these disabled registers may potentially be re-enabled if it can be determined that the secure code that is being resumed has not been tampered with during the time that it was suspended.

In one embodiment, to deal with the "leaking" of data stored in registers 140 between secure and non-secure code segments a set of registers 140 which are to be used only when the CPU 120 is executing secured code may be identified. In one embodiment, this may be accomplished utilizing a version of the register renaming and scoreboarding mechanism, which is practiced in many contemporary CPU designs. In some embodiments, the execution of a code block in secured mode is treated as an atomic action (e.g., it is non-interruptible) which may make this such renaming and scoreboarding easier to implement.

Even though there may seem to be little possibility of the CPU 120 executing a mixture of "secured" code block (code from the secured I-Cache 130) and "unsecured code" (code in another location such as normal I-Cache 150 or another location in memory), such a situation may arise in the process of switching contexts such as when jumping into interrupt routines, or depending on where the CPU 120 context is stored (most CPU's store the context in main memory, where it is potentially subject to discovery and manipulation by an unsecured code block).

In order to help protect against this eventuality, in one embodiment another method which may be utilized for protecting the results obtained during the execution of a secured code block that is interrupted mid-execution from being exposed to other execution threads within a system is to disable stack pushes while the target device 100 is operating in secured execution mode. This disabling of stack pushes will mean that a secured code block is thus not interruptible in the sense that, if the secured code block is interrupted prior to its normal completion, it cannot be resumed and therefore must be restarted from the beginning. It should be noted that in certain embodiments if the "secured execution" mode is disabled during a processor interrupt, then the secured code block may also potentially not be able to be restarted unless the entire calling chain is restarted.

Each target unit 100 may also have one or more secret key constants 104; the values of neither of which are software-readable. In one embodiment, the first of these keys (the primary secret key) may be organized as a set of secret keys, of which only one is readable at any particular time. If the "ownership" of a unit is changed (for example, the equipment containing the protocol engine is sold or its ownership is otherwise transferred), then the currently active primary secret key may be "cleared" or overwritten by a different value. This value can either be transferred to the unit in a secure manner or it can be already stored in the unit in such a manner that it is only used when this first key is cleared. In effect, this is equivalent to issuing a new primary secret key to that particular unit when its ownership is changed or if there is some other reason for such a change (such as a compromised key). A secondary secret key may be utilized with the target unit 100 itself. Since the CPU 120 of the target unit 100 cannot ever access the values of either the primary or the secondary secret keys, in some sense, the target unit 100 does not even "know" its own secret keys 104. These keys are only stored and used within the security execution controller 162 of the target unit 100 as will be described.

In another embodiment, the two keys may be constructed as a list of "paired" keys, where one such key is implemented as a one-time-programmable register and the other key in the pair is implemented using a re-writeable register. In this embodiment, the re-writeable register may be initialized to a known value (e.g., zero) and the only option that may be available for the system to execute in secure mode in that state may be to write a value into the re-writeable portion of the register. Once the value in this re-writeable register is initialized with some value (e.g., one that may only be known by a licensing authority, for example), then the system may only then be able to execute more general purpose code while in secure mode. If this re-writeable value should be re-initialized for some reason, then the use of a new value each time this register is written may provide increased security in the face of potential replay attacks.

Yet another set of keys may operate as part of a temporary public/private key system (also known as an asymmetric key system or a PKI system). The keys in this pair may be generated on the fly and may be used for establishing a secure communications link between similar units, without the intervention of a central server. As the security of such a system is typically lower than that of an equivalent key length symmetric key encryption system, these keys may be larger in size than those of the set of secret keys mentioned above. These keys may be used in conjunction with the value that is present in the on-chip timer block in order to guard against "replay attacks", among other things. Since these keys may be generated on the fly, the manner by which they are generated may be dependent on the random number generation system 182 in order to increase the overall system security.

In one embodiment, one method that can be used to affect a change in "ownership" of a particular target unit is to always use the primary secret key as a compound key in conjunction with another key 107, which we will refer to as a timestamp or timestamp value, as the value of this key may be changed (in other words may have different values at different times), and may not necessarily reflect the current time of day. This timestamp value itself may or may not be itself architecturally visible (e.g., it may not necessarily be a secret key), but nonetheless it will not be able to be modified unless the target unit 100 is operating in secured execution mode. In such a case, the consistent use of the timestamp value as a component of a compound key whenever the primary secret is used can produce essentially the same effect as if the primary secret key had been switched to a separate value, thus effectively allowing a "change of ownership" of a particular target endpoint unit without having to modify the primary secret key itself As discussed above, in certain embodiments, control over the use or execution of digital content on target device 100 may be exercised in conjunction with a licensing authority 103 (e.g., as depicted in FIG. 1). To exert such control, this licensing authority 103 (which may be referred to as a central licensing authority or CLA, though it will be understood that such a licensing authority need not be centralized and whose function may be distributed, or whose function may be accomplished by content distribution system 101, manual distribution of data on a hardware device such as a memory stick, etc.) may provide a key or authorization code (also referred to as an authcode or AuthCode). This AuthCode may be a compound key (DSn), that is both cryptographically dependent on the digital content distributed to the target device 100 and bound to a particular target device (TDn).

Figure 3:
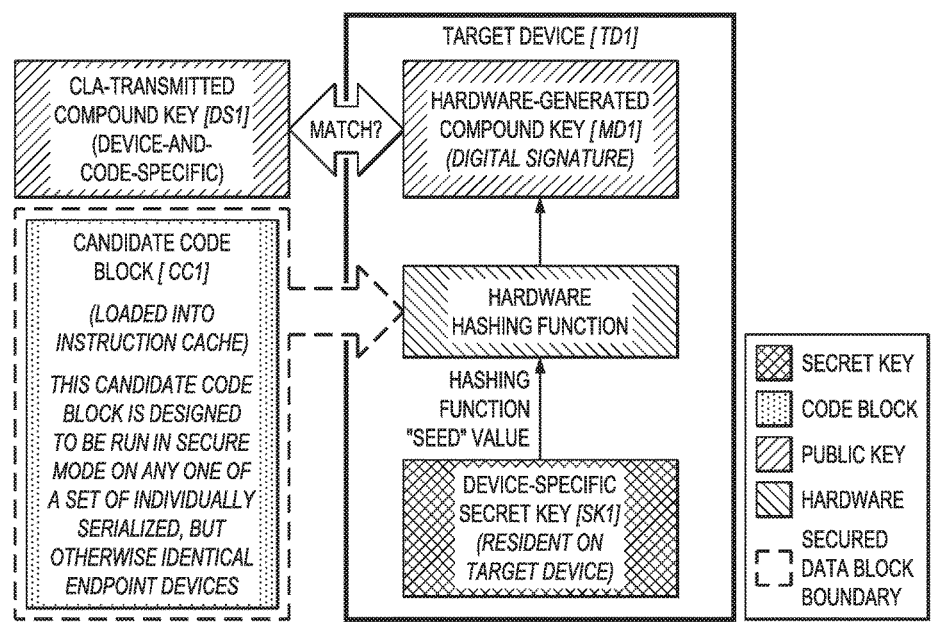
FIG. 3 is a block diagram illustrating one embodiment of a target device loading a secure candidate code block.

To illustrate, in the example as shown in FIG. 3, an embodiment of a target device TD1 may be attempting to execute an application in secure mode. This secure application or code (which may be referred to as candidate code or a (secure) candidate code block (e.g., CC1)) may be used in order to access certain digital content. Accordingly, to enable a candidate code block to run in secure mode on the processor of a particular target device 100 to which the candidate code block is distributed, the licensing authority 103 must supply a correct value of an AuthCode (DS1) to the target device on which the candidate code block is attempting to execute in secure mode (e.g., supply DS1 to target device 1 (TD1)). No other target device (e.g., TDn, where TDn≠TD1) can run the candidate code block correctly with that compound key (e.g., DS1) and no other compound key (DSn assuming DSn≠DS1) will work correctly with that candidate code block on that target device 100 (e.g., TD1).

As will be described in more detail at a later point herein, when target device 100 (e.g., TD1) loads the candidate code block (e.g., CC1) into its instruction cache (and, for example, if CC1 is identified as code that is intended to be run in secure mode), the target device 100 (e.g., TD1) engages a hash function (which may be hardware based) that creates a message digest (e.g., MD1) of that candidate code block (e.g., CC1). The seed value for this hash function is a secret key for the target device 100 (e.g., TD1's secret key (e.g., SK1)).

In fact, such a message digest (e.g., MD1) may be a Message Authentication Code (MAC) as well as a compound key, since the hash function result depends on the seed value of the hash, the secret key of the target device 100 (e.g., SK1). Thus, the resulting value of the message digest (e.g., MD1) is cryptographically bound to both the secret key of the target device 100 and to the candidate code block. If the licensing authority distributed compound key (e.g., DS1) matches the value of the message digest (e.g., MD1) it can be assured that the candidate code block (e.g., CC1) is both unaltered as well as authorized to run in secure mode on the target device 100 (e.g., TD1). The target device 100 can then run the candidate code block in secure mode.

As can be seen then, in one embodiment, when secure mode execution for a target device 100 is performed the target device 100 may be executing code that has both been verified as unaltered from its original form, and is cryptographically "bound" to the target device 100 on which it is executing. This method of ensuring secure mode execution of a target device may be contrasted with other systems, where a processor enters secure mode upon hardware reset and then may execute in a hypervisor mode or the like in order to establish a root-of-trust.

Accordingly, using embodiments as disclosed, any or all of these data such as the compound key from the licensing authority, the message digest, the candidate code block, etc. (e.g., DS1, MD1, CC1) may be completely public as long as the secret key for the target device 100 (e.g., SK1) is not exposed. Thus, it is desired that the value of the secret key of a target device is never exposed, either directly or indirectly. Accordingly, as discussed above, embodiments of the systems and methods presented herein, may, in addition to protecting the secret key from direct exposure, protect against indirect exposure of the secret key on target devices 100 by securing the working sets of processes executing in secure mode on target devices 100.

Embodiments as presented herein may be better understood with reference to U.S. Pat. No. 7,203,844, issued Apr. 10, 2007, entitled "Recursive Security Protocol System and Method for Digital Copyright Control", U.S. Pat. No. 7,457,968, issued Nov. 25, 2008, entitled "Method and System for a Recursive Security Protocol for Digital Copyright Control", U.S. Pat. No. 7,747,876, issued Jun. 29, 2010, entitled "Method and System for a Recursive Security Protocol for Digital Copyright Control", U.S. Pat. No. 8,438,392, issued May 7, 2013, entitled "Method and System for Control of Code Execution on a General Purpose Computing Device and Control of Code Execution in an Recursive Security Protocol", U.S. Pat. No. 8,726,035, issued May 13, 2014, entitled "Method and System for a Recursive Security Protocol for Digital Copyright Control", U.S. Pat. No. 9,710,617 issued Jul. 18, 2017, entitled "Method and System for a Recursive Security Protocol for Digital Copyright Control", U.S. Pat. No. 9,575,906 issued Feb. 21, 2017, entitled "Method and System for Process Working Set Isolation", U.S. Pat. No. 9,734,355 issued Aug. 15, 2017, entitled "System and Method for an Efficient Authentication and Key Exchange Protocol," U.S. Pat. No. 9,705,677 issued Jul. 11, 2017, entitled, "Method and System for Control of Code Execution on a General Purpose Computing Device and Control of Code Execution in a Recursive Security Protocol", U.S. Pat. No. 9,817,953 issued Nov. 14, 2017, entitled, "Systems and Methods for Establishing and Using Distributed Key Servers", U.S. patent application Ser. No. 14/683,924, filed Apr. 10, 2015, entitled, "System and Method for Sharing Data Securely", U.S. patent application Ser. No. 14/930,864, filed Nov. 3, 2015, entitled, "System and Method for a Renewable Secure Boot", U.S. patent application Ser. No. 14/983,051, filed Dec. 29, 2015, entitled, "System and Method for Secure Code Entry Point Control", and U.S. patent application Ser. No. 15/167,254 entitled "Distributed and Hierarchical Device Activation Mechanisms" by William V. Oxford et al. filed May 27, 2016, which are all hereby incorporated by reference in their entireties for all purposes.

As discussed above then, in certain embodiments data such as a compound key from the licensing authority, a message digest, a candidate code block, etc. (e.g., DSn, MDn, CCn) may be completely public as long as the secret key for a target device 100 (e.g., SKn) is not exposed. It is of paramount importance therefore that the value of the secret key of a target device is never exposed, either directly or indirectly. In one embodiment, as a manner of protecting a secret key of a target device, the target device may be architected so that there is a register that contains the secret key for the device (referred to as the hardware secret, the secret key, or Kh_otp, interchangeably) that is non-volatile, immutable and, subsequently to being programmed, cannot be written to, or directly read from, again. This register may be referred to as the secret key register or Kh_otp register.

In combination with the Kh_otp register, there may be a re-writeable register (for example the volatile secret register mentioned earlier) that by default is loaded with the value in the Kh_otp register at system power up or initialization. This volatile register may also be configured such that it cannot be read, but only used as an input to the hash function block of the target device. The value stored in this register (referred to as the current Kh Next value) can be overwritten only by a correctly authorized secure operation (or Sec_Op). Such a Sec_Op can only be authorized by an entity that provides an AuthCode based on the current value of the volatile Kh register (which defaults to the Kh_otp value at power-up) or a value derivative thereof (if the volatile secret register has been written to using a correctly authorized Sec_Op). Once the value stored in the volatile secret register is changed, then all previously-authorized Sec_Ops (e.g., based on prior values of this secret) are no longer authorized (i.e., AuthCodes based on prior values for the volatile secret are no longer valid).

FIG. 4 depicts an embodiment of such an architecture for secret key registers and a one-way hash function block for a target device. It will again be noted that while certain of these blocks may be described as hardware in certain embodiments, software may be utilized to accomplish similar functionality with equal efficacy. Here, Kh_otp register 422 contains a secret key (also referred to as an immutable device key or Kh_otp) for the target device. The value stored in the Kh_otp register 422 can never be read by the target device and once written with a value, Kh_otp register 422 can never be overwritten or written again. At device power-up, initialization, restart, hardware or software reset, etc. (collectively referred to as reset) the value stored in Kh_otp register 422 is written into a volatile secret register (Kh_next) 420. Since this Kh_next register 420 is a volatile register, then the current value in this register 420 is lost at power-up, initialization, restart, etc. The device is configured such that the value for this volatile secret register may be used as (at least part of) the cryptographic key input to hash function block 410 but cannot otherwise be used or read. This Kh_next register 420 may, however, be overwritten using a Sec_Op on the target device.

The Kh register 424 is similar to the Kh_next register 420 in that it is also a volatile secret register (e.g., at power-up, initialization, restart, etc. the current value in Kh register 424 is lost). At device power-up, initialization, restart, etc., or when the target device exits secure mode, the value stored in Kh_next register 420 is written into the Kh register 424. Kh register 424 is also configured such that it can be used as (at least part of) the cryptographic key input to hash function block 410 but cannot otherwise be used or read. For example, the value in Kh register 424 (referred to as Kh) may be concatenated with another value (such as the device serial number, a nonce, an activation secret, all zeros, etc.) stored in another memory location 426 to form a cryptographic key. However, Kh register 424 may be temporarily overwritten using a Sec_Op on the target device, but when the Sec_Op that is using this Kh register 424 terminates, the value in the Kh register will be overwritten by the value contained in the Kh_next register 420. Such a Sec_Op can only be authorized by an entity that provides an AuthCode based on the original value of the Kh register 424, which may be the Kh_otp value 422 or a value derived therefrom.

Hash function block 410 may be a cryptographic one-way hash function which receives input data from one or more registers or other memory locations 418 on the target device and generates an output result, referred to herein as a message authentication code (MAC) or keyed-hash message authentication code (HMAC), to a memory location (e.g. register) 412 using the value in Kh register 424 as at least part of the cryptographic key for the one-way hash function. In particular, the value in Kh register 424 may be concatenated with another value in memory location 426 to form the cryptographic key or a logical operation (e.g., AND, OR, XOR) performed between the value in Kh register 424 and another value in memory location 426 to form the cryptographic key, as desired.

The device key in Kh_otp register 422 or the secret key in Kh register 424 or Kh_Next register 420 are thus never visible to the CPU or software, but may only be used as input directly (in the case of the Kh register 424) or indirectly to hash function block 410. Hash function block 410 may also only be executed on input data using the value in Kh register 424 as at least part of the key to the hash function using a Sec_Op on the target device. The hash function block 410 may implement a cryptographic hash function such as a Secure Hash Function (SHA) including SHA-2 or SHA-3 or the like in hardware or in software. Other cryptographic hash functions may be used and are fully contemplated herein. Note that at least because of the nature of the hash function implemented by hash function block 410, the output result from hash function block 410 can be published, if desired, without exposing the values in Kh_otp register 422, Kh_Next register 420 or Kh register 424. This is possible at least because the output of hash function block 410 does not provide knowledge of the key used (e.g., the value in Kh register 424), even if the value of the input data in memory location 418 is known.

The depicted architecture thus provides a powerful mechanism for ensuring the security of devices within a topology of CLAs and target devices such as that depicted in FIG. 1. In particular, one of the issues that arises in such a topology is the encryption of data between various entities, including in particular the encryption of data passing between CLAs and target devices. While asymmetric cryptography may be utilized, the use of such asymmetric cryptographic algorithms is less than desirable, as the computational complexity involved in the use of such algorithms is prohibitive. Additionally, the repeated use of such asymmetric keys and exposure of the encrypted results may provide fodder for attempts at discovering the private key of the asymmetric key pair. Moreover, the use of asymmetric cryptography means that, by the very nature of asymmetric cryptography, at least one half of the key pair utilized (e.g., the public key) is not bound to a particular device or pair of devices.

What is desired then, is the ability to use symmetric cryptography to communicate encrypted data. The use of symmetric cryptography, however, brings up a number of obstacles. In the main, these obstacles are centered around the exchange of a symmetric key between devices (e.g., a target device and a CLA) without exposing the symmetric key itself, or the secret key of a target device. Embodiments as disclosed may utilize the architecture depicted above to surmount these obstacles among others by allowing symmetric keys to be generated and shared between devices where the symmetric key may be bound to both devices. In particular, embodiments may utilize the architecture of the target device, as depicted above in the creation of a symmetric key to be utilized. That symmetric key may be communicated to another device (e.g., the CLA for example). Subsequently to the exchange of the symmetric key, communications between these devices may be encrypted and decrypted using this symmetric key. By utilizing a Kh_otp value (or derivative thereof) of the target device to generate the symmetric key, the symmetric key bound to that device may be generated such that only that target device can decode a message from another device (e.g., a CLA) encrypted with that symmetric key.

As an addendum to the problems discussed above, a related problem is the provisioning of the immutable secret key Kh_otp on a target device. As discussed above, it is of paramount importance to the security of embodiments depicted herein that the immutable secret key (Kh_otp) of a device never be exposed, as exposure of this key would completely compromise that target device. Accordingly, the problem of how to fix or store this value in the Kh_otp register of a target device is presented. One solution to this problem is to have the person or factory that fabricates or configures the target device (or secure execution unit of CPU, etc.) burn a known value into the Kh_otp register (e.g., at the factory). This solution is less than ideal, however. In some cases the chip or application specific integrated circuit (ASIC) that includes the Kh_otp may be fabricated by a different entity than the provider of the target device and may even be in a different geographic location or country. These manufacturers may be less than fully trustworthy for a variety of reasons.

To remedy these issue, in one embodiment, the Kh_otp register can be provided by, or include, a physically unclonable function (PUF), including for example PUFs that utilize intrinsic or extrinsic randomness. In this manner, the PUF may generate the immutable secret (the Kh_otp value), which is then written into the Kh Next register, etc. when the target device is powered on, restarted, initialized, etc.

In other embodiments, the architecture as depicted above may be leveraged to initialize the value of the Kh_otp register on the target device itself, without ever exposing the value of Kh_otp externally to the target device (e.g., self-provisioning the secret). Referring now to FIGS. 5A-5D, a diagrammatic representation of one embodiment of the initialization of a target device with a Kh_otp value in the Kh_otp register and the subsequent use of that Kh_otp value to create one or more secret values is depicted. It will be noted that while certain of these blocks may be described as hardware in certain embodiments, software may be utilized to accomplish similar functionality with equal efficacy. First referring to FIG. 5A, Kh_otp register 522 may be a write once register configured so that it may only be written a single time and can thereafter never be re-written or directly read as discussed above. To allow an entity to initiate the initialization of the Kh_otp register 522 with a new value, when a target device with Kh_otp register 522 leaves a factory or fabrication plant, the default value in Kh_otp register 522 may be some known quantity, such as all zeros.

Accordingly, a provider, administrator, manufacturer of the target device, CLA, or other entity (collectively referred to as an entity or external service) may wish to initialize Kh_otp and have a value for Kh_otp written in the Kh_otp register 522. The external service wishing to initialize the Kh_otp register 522 may provide an AuthCode for a Sec_Op to write the Kh_otp register. As the value of the Kh_otp register 522 is initially known, this AuthCode may be based on the default value currently in Kh_otp register 522 and can then be determined by the external service without any other specific knowledge of the target device being initialized. Alternatively, in some embodiments this initial operation may not need to be performed as a Sec_Op.

At reset of the target device the Kh Next register 520 is loaded with the Kh_otp value from Kh_otp register 522 (which may be all zeros) (step 501). The value in the Kh Next register (again all zeros) is then loaded into the Kh register 524 (step 503). If needed, an AuthCode (e.g., based on the current all zero value of Kh_otp) is written into an AuthCode register (not shown). The external service performing the initialization of the Kh_otp value may also provide a random number (e.g., an external entropy value) which is placed in input register 518 (or other memory location used for input to hardware hash function 510) (step 505). The external service may also provide its public key (referred to as PubKs where s refers to a service number of the initializing external service) to the target device, as will be discussed in more detail later.

Additionally, an internal entropy value may be concatenated with the external value in input register 518 such that the value in the input register 518 is a concatenation of the external entropy value and internal entropy value. This internal entropy value may be a value received (step 507) from a random number generator on the target device (e.g., as discussed above) or, in other embodiments, may be an output of the hardware hash block 510 itself run one or more times on the external entropy value provided by the initializing entity. In other embodiments, if an internal entropy value cannot be generated on the target device such an internal entropy value may be provided by another external service or programmed into a memory location by, for example, a factory programmer. In these embodiments, however, it may be important to keep such an internal entropy value secret (or have the value immediately disposed of after programming) in order that the security of the target device is not compromised.

It will be noted here that, in certain embodiments, an initialization process for the Kh_otp value may be accomplished using solely the provided external entropy value as an initial input (e.g., without the internal entropy value). These embodiments may, however, allow the initializing entity to "snoop" or otherwise observe communications or operation conducted by other entities that use derivative values of Kh_otp.

If the Kh_otp initialization is being performed as a secure operation, the processor of the target device may attempt to execute the Sec_Op for creating the Kh_otp value using the AuthCode provided by the initializing external service. If the AuthCode is correct for the Sec_Op of Kh_otp creation (or generally creation of a value using hardware hash function 510), then the processor executes this Sec_Op in secure mode. In cases where Kh_otp creation is not being performed as a secure operation the Kh_otp initialization process may be executed without checking an AuthCode. In either case, the hardware hash function block 510 may generate a Kh_otp value by performing a keyed hash of the value in the input register 518 using a key comprised of the concatenation of the value in the Kh register 524 (which may be all zeros) and another value in memory location 526 such as the device identifier (e.g., serial number) of the target device or portion thereof. The output of hardware hash block 510 (here the new Kh_otp value) is stored in hardware hash output register 512 (step 509).

Recall from the above discussions that target devices utilize an AuthCode to perform Sec_Ops (e.g., any operation requiring the use of a derivative of Kh_otp used as the value in the Kh register) and that AuthCodes may only be created by an external service that knows the current Kh value of a device. Thus, in the case where the Kh_otp is self-provisioned on a device there in no other external service that is aware of this Kh_otp value after a device has been programmed. Thus, any AuthCodes designed to run Sec_Ops on the device in the initial state where Kh=Kh_otp must be created between the time when the Kh_otp value is initially created (e.g., step 509) and written to the Kh_otp register 522 and the next reset of the device.

Accordingly, subsequently to being generated, the value in output register 512 (the new Kh_otp value) is then written to the Kh register 524 (step 511) for use in creation of one or more AuthCodes based on this new Kh_otp value. Again, the writing of the Kh register 524 may be a Sec_Op, thus the processor may attempt to execute the Sec_Op for writing value using the AuthCode provided by the initializing external service (e.g., here based on a Kh_otp value of all zeros). If the Authcode is correct for the Sec_Op of writing to the Kh register 524, then the processor executes this Sec_Op in secure mode and writes the new Kh_otp value in the Kh register 524.

Figure 5A:
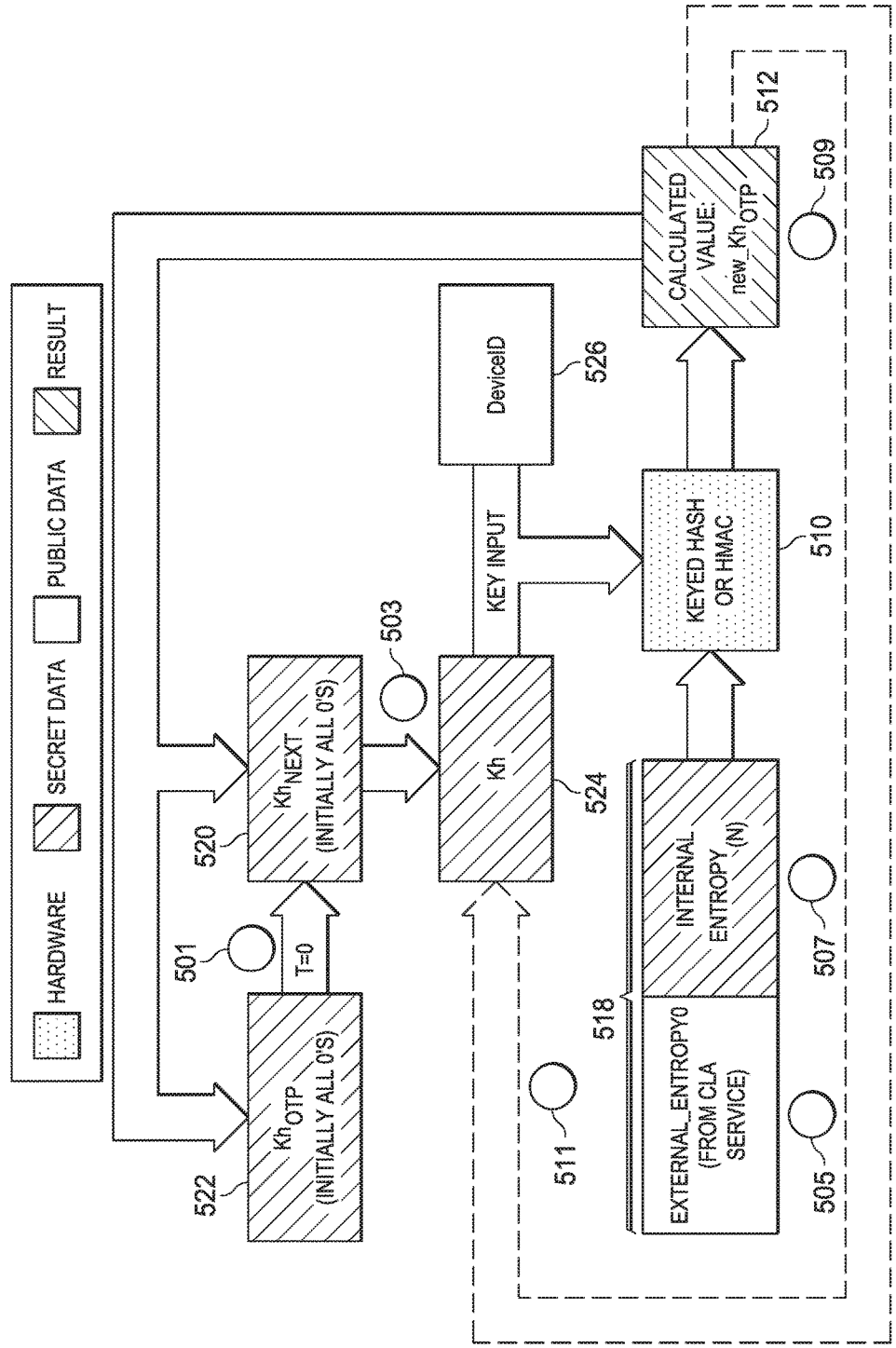
FIG. 5A-5D are block diagrams illustrating embodiment of the self-provisioning and use of a secret of a target device.
Figure 5B:
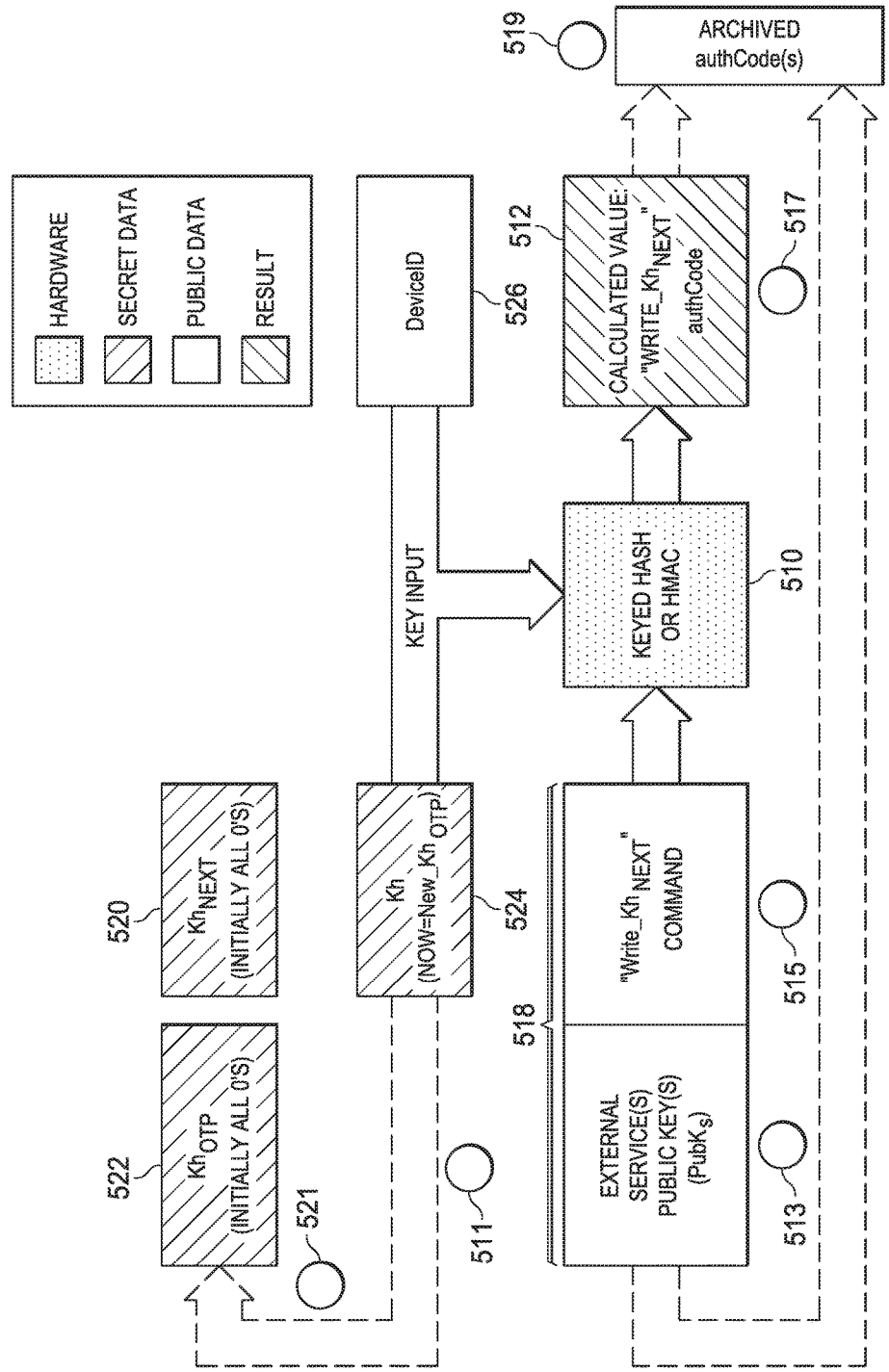

Moving now to FIG. 5B, one embodiment of creating AuthCodes based on a self-provisioned Kh_otp value is depicted. In particular, while AuthCodes for almost any Sec_Op desired may be created at this point using embodiments of the same technique depicted in FIG. 5B, to initialize an external service to create AuthCodes or to provide the ability for an external service to authorize other external service to create AuthCodes or utilize the device, the Sec_Op of writing a Kh_Next value may be important.

Here, the Kh_otp value stored in Kh register 524 (at step 511) can be used to create an AuthCode that will allow a "Write Kh Next" Sec_Op to be performed (a "Kh Next AuthCode"). This "Write Kh Next" Sec_Op will cause a new Kh Next value to be generated and written to the Kh Next register 520 based on an external service public key (e.g., as provided in step 505) and the command or code for the "Write Kh Next" operation, which may be a single bit, a bit vector, processor executable code to implement the command, etc. The "Write Kh Next" Sec_Op may also be linked to the public key of the external service that creates the Kh Next AuthCode such that the Kh Next value generated by the "Write Kh Next" Sec_Op based on that Kh Next AuthCode must be encrypted with the public key of the external service which created that Kh Next AuthCode before the generated Kh Next value is exported. This linkage between the external service's public key and the "Write Kh Next" Sec_Op AuthCode is useful in that it affords the "Write Kh Next" Sec_Op a certain amount of resilience against chosen ciphertext attacks on the value of the Kh register.

Thus, any external service which subsequently utilizes such a Kh Next AuthCode to generate a Kh Next value (either the external service who created the Kh Next AuthCode originally or another external service) can only obtain an encrypted Kh Next (encrypted with the public key of the external service who created the Kh Next AuthCode) and can only decrypt such an encrypted Kh Next value using the private key of the external service whose public key was used to generate the Kh Next AuthCode used to generate that Kh Next value. It will be noted here that while certain embodiments as depicted herein are described with respect to a "Write Kh Next" command (and an associated Kh Next AuthCode) that causes a new Kh Next value to be generated, written to the Kh Next register and to be encrypted and sent, other embodiments may be utilized with equal efficacy with separate commands that may cause Kh Next values to be separately generated, written, encrypted or sent, or some other combination (e.g., and which may require separate AuthCodes).

More specifically, an initializing external service's public key (received at step 505) may be loaded in into the input register 518 (step 513) along with the "Write Kh Next" command (e.g., the code for the command) (step 515) such that input register 518 contains a concatenation of the two values. If the AuthCode creation or use of hardware hash function block 510 is being performed as a secure operation, the processor may attempt to execute the Sec_Op for creating the AuthCode or use of hardware hash function block 510 (e.g., using the AuthCode provided by the initializing entity). If the AuthCode is correct for the Sec_Op of AuthCode creation (or generally creation of a value using hardware hash function 510 and the value in Kh register 524), then the processor executes this Sec_Op in secure mode. In cases where AuthCode creation is not being performed as a secure operation the process may be executed without checking an AuthCode, but this may mean that the device's security is non-existent and so, any non-secure Sec_Ops such as this should only be performed in a controlled environment (such as a device provisioning center).

In either case, the hardware hash function block 510 may generate an AuthCode value for the "Write Kh Next" command (a Kh Next AuthCode) by performing a keyed hash of the value in the input register 518 using a key comprised of the concatenation of the value in the Kh register 524 (which may be the generated Kh_otp value written at step 511) and another value in memory location 526 such as the device identifier (e.g., serial number) of the target device, or portion thereof. The output of hardware hash block 510 (here the Kh Next AuthCode) is stored in hardware hash output register 512 (step 517). The newly created Kh Next AuthCode (e.g., the value in hash output register 512) can then be archived in a memory location along with the initializing external service's public key (step 519). These values may be archived along with an identifier for the initializing external service (which may have been provided, for example, at step 505 or at a later point) such that the external service's public key or Kh Next AuthCode may be retrieved based on the identifier of the external service's (also referred to as the service identifier or service ID number). This process can then be repeated for any other external services or other Sec_Ops if desired at this point. When all desired AuthCodes for any desired external service's (or Sec_Ops) have been created and archived, the Kh_otp value (resident in Kh register 524) can then be written to the Kh_otp register 522 (step 521).

Once the Kh_otp register 522 is written it cannot be written again or overwritten and cannot be directly read. This may be accomplished using a write once register, burning fuses associated with the Kh_otp register or by another method. A Kh_otp value can thus be generated and stored on the target device without exposing the Kh_otp value to anyone external to the target device. Moreover, in cases where an internal entropy value is used in the creation of the Kh_otp value it may be nearly impossible for any entity to determine the Kh_otp value created, even in cases where the initializing entity has access to the external entropy value provided to the target device or the serial number of the device.

Figure 5C:
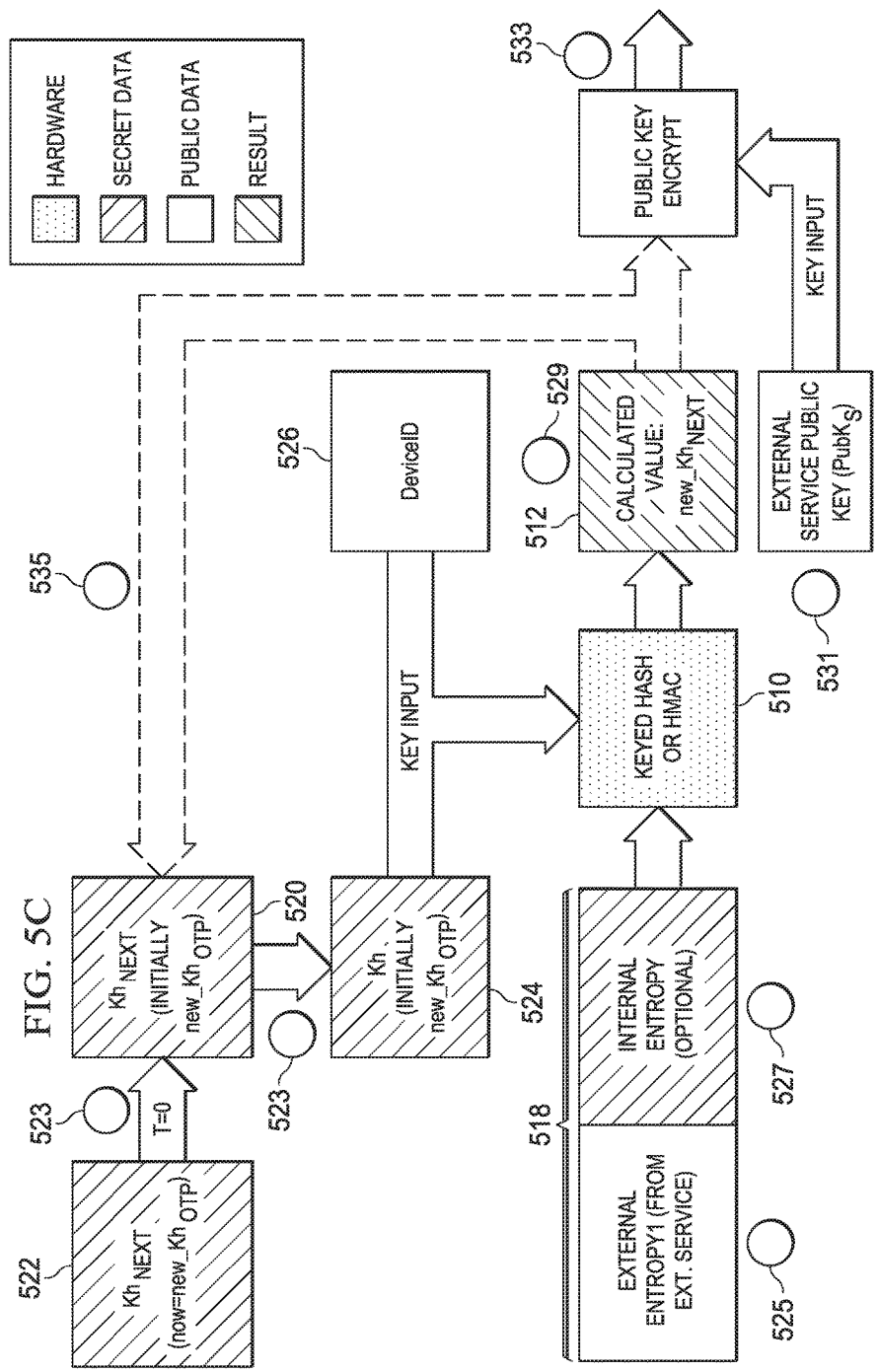

Thus, once the target device is reset, as it now has a Kh_otp value (other than all zeros) in Kh_otp register 522 the target device will always require an AuthCode in order to perform a Sec_Op (e.g., a "Write Kh Next" Sec_Op) that involves the use of a derivative of Kh_otp, and in particular a derivative of the value in the Kh register 524. FIG. 5C depicts an embodiment of using a "Write Kh Next" AuthCode to create a Kh Next value that allows an external service to manage a target device securely using the created Kh Next value (i.e., that allows the target device to be "registered" with a service such that the service can generate AuthCodes for the device. Data going between the external service and the target device can be symmetrically encrypted using the Kh Next value, or other operations performed based on the Kh Next value in order to generate, for example, a suitable session key for both the target device and the external service. While this embodiment will be depicted utilizing an AuthCode as created in FIG. 5B it will be noted that similar embodiments may be utilized to determine and write Kh Next values using AuthCodes determined subsequently to the embodiment performed in FIG. 5B and that may have been determined based on the AuthCode created according to the embodiment of FIG. 5B. Thus, as can be seen, a hierarchy of registering entities may be created whereby an AuthCode for writing a Kh Next value created by one external service may be provided to another external service who can utilize that AuthCode to create a Kh Next value and associated AuthCodes associated with that sub-service, etc.

With that in mind, when a target device is reset, the value in the Kh_otp register 522 (Kh_otp) is loaded into the Kh Next register 520 and subsequently into the Kh register 524 (step 523). An external service may request the target device create a new Kh Next value (e.g., perform a "Write New Kh Next" Sec_Op) and provide an entropy value (e.g., a random number) and the service identifier of the external service (step 525). The target device can then locate the "Write New Kh Next" AuthCode and the public key associated with the service identifier of the external service in the set of archived AuthCodes and keys maintained in memory at the target device. Alternatively, in other embodiments, the "Write New Kh Next" AuthCode and public key of the requesting external service may be provided by the external service in the request to perform the "Write New Kh Next" command.

The "Write New Kh Next" AuthCode is written into an AuthCode register (not shown). The entropy value provided by the external service may also be placed in the input register 518 (or other memory location used for input to hardware hash function 510). In one embodiment, the public key of the requesting external service may be utilized as the external entropy value. By using the public key as the entropy value embodiments may obtain addition additional protection against a "chosen ciphertext" attack in which statistical inference may be used to determine a key by repeatedly providing inputs to a key generation function and analyzing the outputs. Specifically, using the external service's public key as an input to generate a value (e.g., Kh Next) that will itself be encrypted by that public key may greatly increase the difficulty of making such statistical inferences.

Additionally, in some embodiments, an internal entropy value may be concatenated with the external entropy value in input register 518 such that the value in the input register 518 is a concatenation of the external entropy value from the external service and the internal entropy value (step 527). This internal entropy value may be a value received from a random number generator on the target device (e.g., as discussed above) or, in other embodiments, may be an output of the hardware hash block 510 itself run one or more times on the external entropy value provided by the external service. In other embodiments, if an internal entropy value cannot be generated on the target device such an internal entropy value may be provided by another external service or programmed into a memory location by, for example, a factory programmer as discussed. It will be noted here that, in certain embodiments, a Kh Next value may be determined using solely the provided external entropy value as an input (e.g., without the internal entropy value).

The processor of the target device may attempt to execute the Sec_Op (e.g., the "Write Kh Next" Sec_Op) for creating and writing the Kh Next value using the "Write New Kh Next" AuthCode provided by the initializing external service. If the AuthCode is correct for the Sec_Op (of "Write Kh Next") based on the value in the Kh register 524 (which may be Kh_otp here), then the processor executes this Sec_Op in secure mode (step 529). The hardware hash function block 510 may generate a Kh Next value (new_Kh Next) by performing a keyed hash of the value in the input register 518 using a key comprised of the concatenation of the value in the Kh register 524 (which may be Kh_otp here) and another value in memory location 526 such as the device identifier (e.g., serial number) of the target device or portion thereof. The output of hardware hash block 510 (here the new_Kh Next value) is stored in hardware hash output register 512.

As discussed above, the "Write Kh Next" Sec_Op is configured such that the Kh Next value generated by the "Write Kh Next" Sec_Op based on that "Write New Kh Next" AuthCode must be encrypted with the public key of the external service used to create that Kh Next AuthCode before the generated Kh Next value is exported. Thus, the public key associated with the service identifier for the external service or the "Write New Kh Next" AuthCode (e.g., as located or provided by the external service) may be used to encrypt the generated Kh Next value (e.g., new_Kh next) in output register 512 (step 531) and the encrypted new_Kh Next value sent to the external service (step 533). The external service which initiated the "Write New Kh Next" command may then receive the encrypted new_Kh Next value sent from the target device and may decode the new_Kh Next value using the private key of the external service matching the public key with which the new_Kh Next value was encrypted.

In a slight variation of the procedure described above, in some embodiments it may be desired for the device to create a "temporary" Kh value that is used for a certain amount of time and then discarded, never to be used again. In that case, the device may be instructed to create a "new Kh" value rather than a "new Kh_next" value. This secure operation would then construct a new value for the "Kh" register, write that value to the Kh register and then continue to operate in secure mode until the Sec_Op is completed. At that point, then the device would exit the Sec_Op, causing the existing "Kh_next" register value to be written to the Kh register, thus erasing the existing Kh value (which was being used in the previous Sec_Op). If this overwritten Kh value was based on some internal device entropy, then it could ostensibly never be recreated, making any such secrets that were calculated during the previous Sec_Op opaque to any observers (external or internal). Since this is a distinctly different operation than the "Write New Kh Next" operation described above, the AuthCode associated with such an operation will necessarily be different from the "Write New Kh Next" AuthCode. Furthermore, even if the "Write New Kh Next" and the "Write Temporary Kh" AuthCodes were both known, it would still not provide an external attacker enough information to recreate any secrets that were created during the Sec_Op that was executing during the tenure of the temporary Kh value.

At this point, the discussion above regarding the creation of a hierarchy of external services will be recalled. In particular, a "root" service (or indeed any external "parent" service that wishes to create a "sub" or "dependent" service) may desire to hand-off control of a target device to another dependent service. In this case the root or parent service should not share its Kh Next value (e.g., here new_Kh Next) with the dependent service. Instead, in embodiments, the parent service may create (or allow the dependent service to create) and encrypt a derivative of the parent's Kh Next value (here new_Kh Next) with the public key of the dependent service. If the newly derived Kh Next value (e.g., new_Kh Next2) is derived from internal entropy on the device (which is not visible to the parent service), then the parent service may not even be able to observe data created or used by the dependent service and the target device.

Thus, in one embodiment, at this point, an AuthCode for a "Write Kh Next" command may be created for a dependent service. In particular, the handing-off of control between a parent service and a dependent service may be accomplished by the creation of an AuthCode for a "Write Kh Next" Sec_Op based on the Kh Next value of the parent service (Service 1) and the public key of the dependent service (Service 2). To accomplish the creation of the AuthCode for the dependent service (Service 2), the parent service (Service 1) may be aware of the public key for the dependent service (Service 2) and use this public key to create an AuthCode for the Sec_Op of "Write Kh Next" using the new_Kh Next value determined for the parent service (Service 1). The creation of this AuthCode for the dependent service (Service 2) may be accomplished substantially similarly to the creation of the AuthCode as depicted in FIG. 5B.

To illustrate in more detail, here the new_Kh Next value stored in output register 512 may be written to the Kh register 524 and used to create the AuthCode that will allow a "Write Kh Next" Sec_Op to be performed by a dependent service (Service 2). The "Write Kh Next" Sec_Op will also be linked to the public key of the dependent service (Service 2) to whom it is desired to cede control of the target device. The parent service (Service 1) may provide the public key of the dependent service (the public key of Service 2) which is loaded into the input register 518 along with the "Write Kh Next" command such that input register 518 is a concatenation of the two values. The processor may execute the Sec_Op for creating the AuthCode or use of hardware hash function block 510. This AuthCode may be provided by the parent service (Service 1) and be based on the new_Kh Next value sent to it (step 533). The hardware hash function block 510 may generate an AuthCode value for the "Write Kh Next" command for the dependent service (a "Write Kh Next" AuthCode for Service 2) by performing a keyed hash of the value in the input register 518 using a key comprised of the concatenation of the value in the Kh register 524 (which may be the new_Kh Next value) and another value in memory location 526 such as the device identifier (e.g., serial number) of the target device, or portion thereof. The output of hardware hash block 510 (here the "Write Kh Next" AuthCode for Service 2) is stored in hardware hash output register 512 and archived in a memory location along with the dependent service's public key (e.g., the public key for Service 2). These values may be archived along with an identifier for the dependent service (Service 2) such that the dependent service's public key or "Write Kh Next" Sec_Op AuthCode may be retrieved based on the identifier of the dependent service. The newly created "Write Kh Next" AuthCode for the dependent service (Service 2) may also be sent to the parent service (Service 1) which created the AuthCode so that the parent service may provide the AuthCode to the dependent service (Service 2) in order to hand-off control of the target device to the dependent service (Service 2) when desired. This process can then be repeated by the parent service to create "Write Kh Next" AuthCodes for any other dependent services at this point.

The generated Kh Next value (e.g., new_Kh next) in output register 512 (new_Kh Next) can then be written to the Kh Next register 520 (step 535). As the "Write Kh Next" command Sec_Op has now completed, the target device may exit secure mode execution. This exit from secure mode causes the value stored in Kh Next register 520 (e.g., now new_Kh Next) to be written into Kh register 524 (if it is not in Kh register 524 already). This new_Kh Next value may be used by the external service to manage the target device, as the new_Kh Next value is contained in the Kh register 524 of the target device, allowing the external service to create AuthCodes for desired operations based on the new_Kh Next value, encode data using this value using symmetric encryption, or perform other operations on the target device that may require the knowledge of the value in the Kh register 524.

Figure 5D:
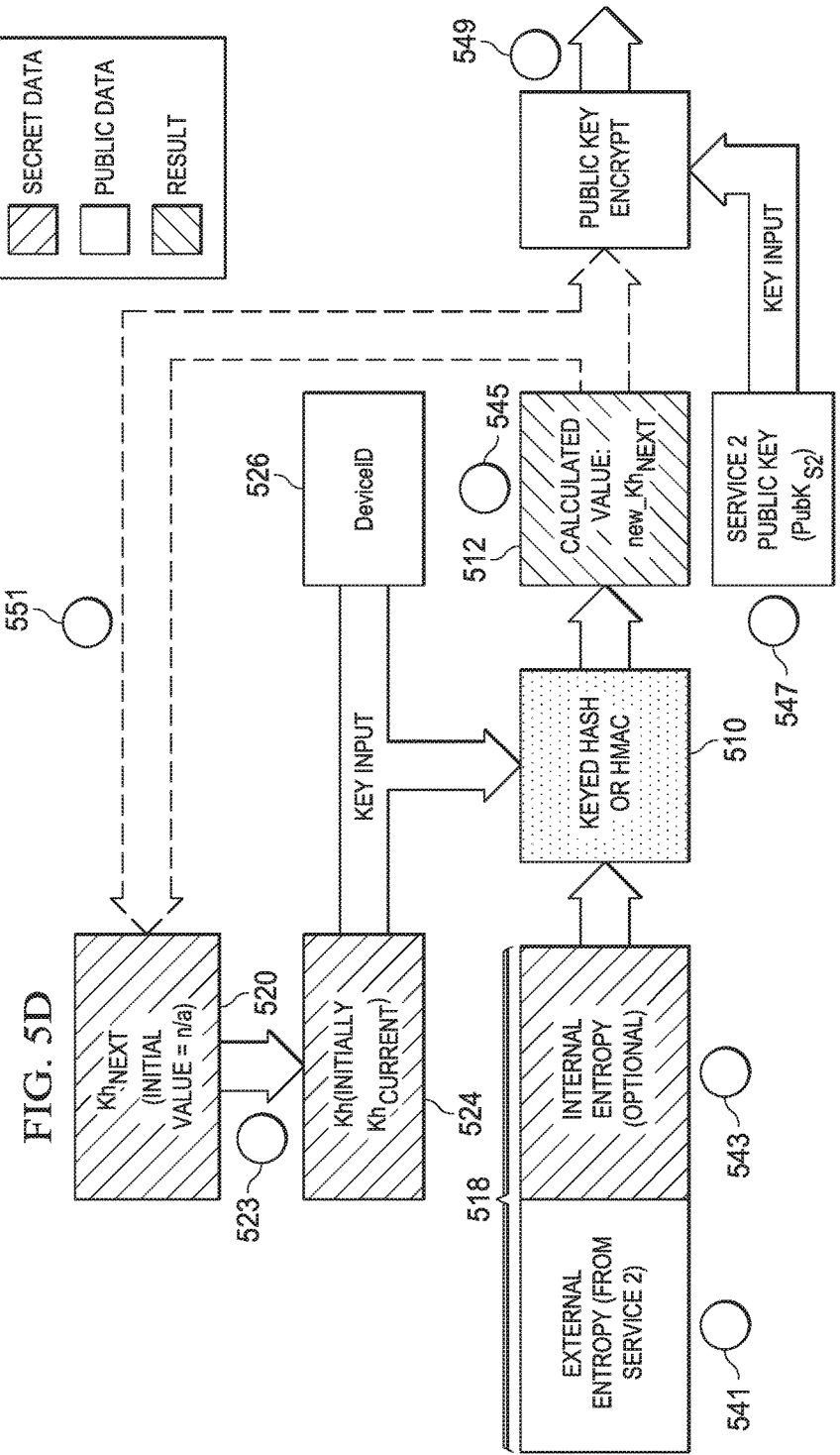

In certain embodiments, as discussed, the parent service (Service 1) may desire to hand-off control of the target device. In such instances the parent service (Service 1) may have created an AuthCode for this dependent service (Service 2) and may hand-off control of the target device by providing the AuthCode created for that dependent service (based on the public key of the dependent service) to that dependent service (Service 2). FIG. 5D depicts one embodiment of a dependent service utilizing a "Write Kh Next" AuthCode provided by a parent service to create a Kh Next value that allows the dependent service to manage the target device securely using a created Kh Next value. Recall from the above discussion for FIG. 5C that a parent service (Service 1) may create a "Write Kh Next" AuthCode for the dependent service (Service 2) based on a Kh Next value for the parent service (new_Kh Next referred to here as new_Kh Next1 or Kh Current) and the public key of the dependent service (Service 2). This "Write Kh Next" AuthCode for the dependent service can be provided to the dependent service (Service 2) when the parent service wishes to hand-off control of the target device to the dependent service (Service 2). Thus, at this point the value (Kh Current) may be present in the Kh Next register 520 or the Kh register 524. The dependent service (Service 2) may request the target device create a new Kh Next value (e.g., perform a "Write New Kh Next" command) and provide an entropy value (e.g., a random number) and the service identifier of the external service (step 541). The entropy value may be signed with the key of the dependent service (Service 2). The target device can then locate the "Write Kh Next" AuthCode and the public key associated with the service identifier of the dependent service (Service 2) in the set of archived AuthCodes and keys maintained in memory at the target device. Alternatively, in other embodiments, the "Write Kh Next" AuthCode and public key of the dependent service (Service 2) may be provided by the dependent service (Service 2) in the request to perform the "Write New Kh Next" command. If the entropy value provided by the dependent service (Service 2) is signed by the dependent service (Service 2) it may be validated using the public key of the dependent service (Service 2).

The "Write Kh Next" AuthCode provided by the dependent service (Service 2) is written into an AuthCode register (not shown). The entropy value provided by the dependent service (Service 2) may also be placed in the input register 518 (or other memory location used for input to hardware hash function 510). Additionally, in some embodiments, an internal entropy value may be concatenated with the external entropy value in input register 518 such that the value in the input register 518 is a concatenation of the external entropy value from the external service and the internal entropy value (step 543).

Alternately, in some embodiments the entropy value provided to the target device may be signed by the current Kh value of the device itself. Note that this signature could only be calculated by an entity that has some knowledge of the current Kh value (e.g., Service 1 in the current example). However, this signature could only be correctly evaluated by the device while it is in the current state (i.e., with the desired value of Kh). Thus, this signature mechanism could be policy dependent and would not necessarily be valid at all times (as opposed to a signature that was based on a services' public/private key pair). Additionally, such a signature could be validated much more rapidly than one that was based on a public/private key pair, since it would not depend on any asymmetric cryptographic operations.

The processor of the target device may attempt to execute the Sec_Op (e.g., the "Write Kh Next command) for creating and writing the Kh Next value using the "Write Kh Next" AuthCode provided by the dependent service (Service 2). If the AuthCode is correct for the Sec_Op (of the "Write Kh Next" command) based on the value in the Kh register 524 (which may be Kh Current here), then the processor executes this Sec_Op in secure mode (step 545). The hardware hash function block 510 may generate a Kh Next value (new_Kh Next2) by performing a keyed hash of the value in the input register 518 using a key comprised of the concatenation of the value in the Kh register 524 (which may be Kh Current here) and another value in memory location 526 such as the device identifier (e.g., serial number) of the target device or portion thereof. The output of hardware hash block 510 (here the new_Kh Next2 value) is stored in hardware hash output register 512.

As discussed above, the "Write Kh Next" Sec_Op is configured such that the Kh Next value generated by the "Write Kh Next" Sec_Op based on that "Write Kh Next" AuthCode must be encrypted with the public key of the dependent service (Service 2) used to create that "Write Kh Next" AuthCode before the generated Kh Next value is exported. Thus, the public key associated with the service identifier for the dependent service (Service 2) or the "Write Kh Next" AuthCode (e.g., as located or provided by the dependent service (Service 2)) may be used to encrypt the generated Kh Next value (e.g., new_Kh next2) in output register 512 (step 547) and the encrypted new_Kh Next2 value sent to the dependent service (Service 2) (step 549). The dependent service (Service 2) which initiated the "Write New Kh Next" command may then receive the encrypted new_Kh Next2 value sent from the target device and may decode the new_Kh Next2 value using the private key of the dependent service (Service 2) matching the public key with which the new_Kh Next2 value was encrypted.

At this point, if the dependent service (Service 2) wishes to create any services dependent to it (e.g., a Service 3), the dependent service (Service 2) may, in turn, create a "Write Kh Next" AuthCode for a Sec_Op of "Write Kh Next" command for any dependent services (Service 3) here, substantially as discussed above. The generated Kh Next value (new_Kh Next2) in output register 512 can then be written to the Kh Next register 520 (step 551). As the "Write Kh Next" command Sec_Op has now completed the target device may exit secure mode execution. This exit from secure mode causes the value stored in Kh Next register 520 (e.g., now new_Kh Next2) to be written into Kh register 524 (if it is not in Kh register 524 already). This new_Kh Next2 value may be used by the dependent service (Service 2) to manage the target device, as the new_Kh Next2 value is contained in the Kh register 524 of the target device, allowing the dependent service (Service 2) to create AuthCodes for desired operations based on the new_Kh Next2 value, encode data using this value as a key for a symmetric encryption algorithm, or perform other operations on the target device that may require the knowledge of the value in the Kh register 524.

As has been discussed, a Kh_otp value for the target device may be "self-provisioned" using the hardware hash function block on the target device. Alternatively, the Kh_otp may have been initialized at a factory or other entity involved in the provisioning of the target device, or may be provided using a function such as a PUF. Recall from the above discussions that target devices utilize an AuthCode to perform Sec_Ops (e.g., any operation requiring the use of a derivative of Kh_otp (including Kh_otp itself) resident as the value in the Kh register), and that AuthCodes may only be created by an external service that knows a current Kh value (the value in the Kh register) of a device. Thus, in cases where the Kh_otp is provisioned on the target device in another manner than "self-provisioning" there may still be no other external service that is aware of this Kh_otp value after the device has been provisioned. Accordingly, AuthCodes designed to run Sec_Ops on the device must somehow be created. The creation of AuthCodes in these pre-provisioned instances may, however, not be straightforward, as the Kh_otp value may not be readable in the target device and the value may never be directly exposed.

Embodiments may therefore include the ability to operate in a "factory mode" where, in this factory mode, a service may create derivatives of Kh_otp (e.g., AuthCodes) for the target device without itself needing a valid AuthCode to perform the operation. However, it is desired that this factory mode be only utilized in a single, or very limited set of, instances. As such, embodiments may employ a factory mode register on the target device. This factory mode register may include a single bit that when it is in a particular state (e.g., one) allows the target device to perform the Sec_Op of creating Kh_otp derivatives (including AuthCodes) without itself needing a valid AuthCode (e.g., the "factory mode"). When the factory mode register is in the opposite state (e.g., zero) the target device will require a valid AuthCode for all Sec_Ops (e.g. a "normal mode"). The factory mode register may be configured such that it is a one-time programmable register that, once programmed cannot ever be reset. For example, the factory mode register may have one or more fuses that, when blown, allow the value of the factory mode register to be fixed at the state (e.g., zero) indicating the normal mode of operation such that from that point on the target device will require a valid AuthCode to perform a Sec_Op. In this manner, an external service may operate the target device in the factory mode to obtain one or more AuthCodes for the device and fix the factory mode register in the value associated with the normal mode to secure the target device.

Figure 6A:
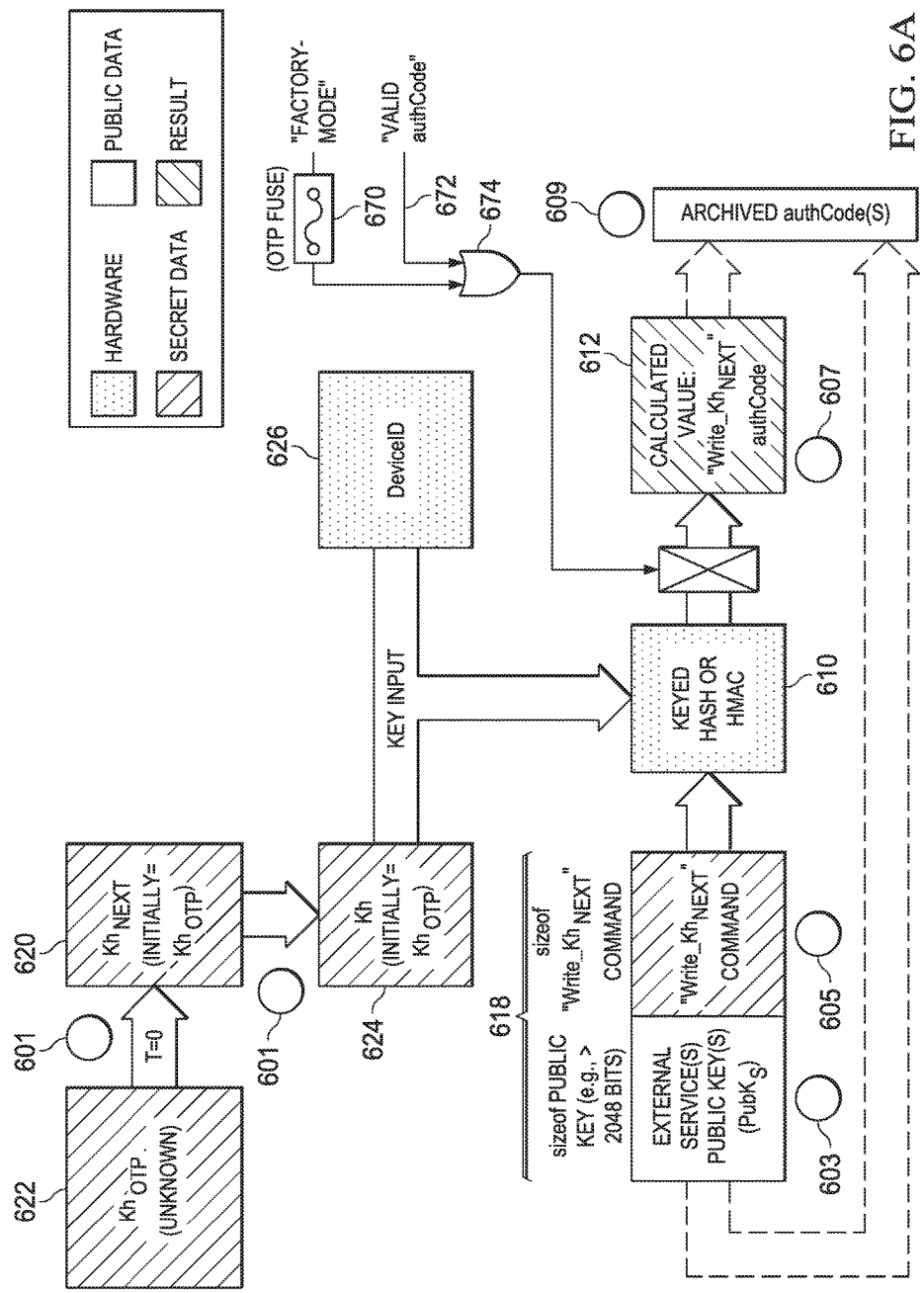

FIGS. 6A and 6B depict a diagrammatic representation of one embodiment of the creation of AuthCodes based on Kh_otp, and the subsequent use of those AuthCodes to create one or more shared secret values in cases where Kh_otp is pre-provisioned on the device. It will be noted that while certain of these blocks may be described as hardware in certain embodiments, software may be utilized to accomplish similar functionality with equal efficacy. First, referring to FIG. 6A, one embodiment of creating AuthCodes based on a pre-provisioned Kh_otp value is depicted. While substantially similar to the architectures discussed above with respect to FIGS. 4 and 5A-5D, in the embodiment depicted in FIGS. 6A and 6B the target device may also comprise OR gate 674 gating the output or use of hardware hash function block 610. The two inputs to gate 674 include a factory mode register 670 and a valid AuthCode line 672.

The factory mode register 670 may be a one-time programmable register (e.g., of one bit) initially in a factory mode state (e.g., a value of one) that, once the fuses are blown, may be fixed to a normal mode state (e.g., a value of zero) and may never be reset back to the factory mode state (e.g., one). The value on the valid AuthCode line 672 may be determined based on an evaluation of an AuthCode in an AuthCode register (not shown) such that the value on the valid AuthCode line 672 is one if the AuthCode in the AuthCode register is valid. Accordingly, if either the factory mode register 670 is in the factory mode state (e.g., one) or the value on the valid AuthCode line 672 is one, the output of OR gate 674 will be one, allowing a Sec_Op utilizing the output of hardware hash function 610 (e.g., based on the value in Kh register 624) to be performed.

In the case of a pre-provisioned Kh_otp value, no valid AuthCodes may currently exist for the target device. However, because factory mode register 670 may initially be in a factory mode state, AuthCodes may be created for the target device using the value in the Kh register without requiring a valid AuthCode for such an operation. In particular, while AuthCodes for almost any Sec_Op desired may be created it may be important to create an AuthCode for the "Write Kh Next" Sec_Op. When the target device is reset, as the Kh_otp may be pre-provisioned, the Kh_otp value pre-provisioned in Kh_otp register 622 will be loaded into Kh Next register 620 and Kh register 624 (step 601). The Kh_otp value stored in Kh register 624 (at step 601) can be used to create an AuthCode that will allow a "Write Kh Next" Sec_Op to be performed (a "Write Kh Next AuthCode").

More specifically, an initializing external service's public key (received at step 603) may be loaded in into the input register 618 (step 603) along with the "Write Kh Next" command (e.g., the code for the command) (step 605) such that input register 618 is a concatenation of the two values. The processor may attempt to execute the Sec_Op for creating the AuthCode or use of hardware hash function block 610 (e.g., using the AuthCode provided by the initializing entity). The ability to perform the secure operation is gated by the output of OR gate 674. In this case, because the factory mode register 670 is in the factory mode state the input to OR gate 674 from factory mode register 670 may be one, the output of OR gate 674 may be one allowing the Sec_Op using hardware hash function block 610 to be performed.

The hardware hash function block 610 may generate an AuthCode value for the "Write Kh Next" command (a "Write Kh Next" AuthCode) by performing a keyed hash of the value in the input register 618 using a key comprised of the concatenation of the value in the Kh register 624 (which may be the pre-provisioned Kh_otp value) and another value in memory location 626 such as the device identifier (e.g., serial number) of the target device, or portion thereof. The output of hardware hash block 610 (here the "Write Kh Next" AuthCode) is stored in hardware hash output register 612 (step 607). The newly created "Write Kh Next" AuthCode (e.g., the value in hash output register 612) can then be archived in a memory location along with the initializing external service's public key (step 609). These values may be archived along with an identifier for the initializing external service (which may have been provided, for example, at step 603 or at a later point) such that the external service's public key or "Write Kh Next" AuthCode may be retrieved based on the identifier of the external service's (also referred to as the service identifier or service identifier number). This process can then be repeated for any other external services or other Sec_Ops if desired. When all desired AuthCodes for any desired external service's (or Sec_Ops) have been created and archived, the fuses on the factory mode register 670 may be blown, fixing the factory mode register 670 at the normal state (e.g., zero) indicating the normal mode of operation such that from that point on the target device will subsequently always require a valid AuthCode in order to perform a Sec_Op.

FIG. 6B depicts an embodiment of using a "Write Kh Next" AuthCode such as that created in the embodiment described in FIG. 6A to create a Kh Next value that allows an external service to manage a target device securely using the created Kh Next value. Recall from the above that fuses on the factory mode register 670 may be blown, fixing the factory mode register 670 at the normal state (e.g., zero). A valid AuthCode is thus required to perform a Sec_Op on the target device. When the target device is reset, the value (Kh_otp) in the Kh_otp register 622 is loaded into the Kh Next register 620 and subsequently into the Kh register 624 (step 613). An external service may request the target device create a new Kh Next value (e.g., perform a "Write New Kh Next" command) and provide an entropy value (e.g., a random number) and the service identifier of the external service (step 615). The target device can then locate the "Write Kh Next" AuthCode and the public key associated with the service identifier of the external service in the set of archived AuthCodes and keys maintained in memory at the target device. Alternatively, in other embodiments, the "Write Kh Next" AuthCode and public key of the requesting external service may be provided by the external service in the request to perform the "Write New Kh Next" command.

The Write Kh Next" AuthCode is written into an AuthCode register associated with the valid AuthCode line 672. The entropy value provided by the external service may also be placed in the input register 618 (or other memory location used for input to hardware hash function 610). Additionally, in some embodiments, an internal entropy value may be concatenated with the external entropy value in input register 618 such that the value in the input register 618 is a concatenation of the external entropy value from the external service and the internal entropy value (step 617). The processor of the target device may attempt to execute the Sec_Op (e.g., the "Write Kh Next command) for creating and writing the Kh Next value using the "Write Kh Next AuthCode" provided by the initializing external service. The ability to perform the secure operation is gated by the output of OR gate 674. If the AuthCode in the AuthCode register (not shown) is correct for the Sec_Op (of the "Write Kh Next" command) based on the value in the Kh register 624 (which may be Kh_otp here), then the value on valid AuthCode line 672 will be one and the output of OR gate 674 will be one, allowing the Sec_Op to be performed.

The processor executes this Sec_Op in secure mode (step 619). The hardware hash function block 610 may generate a Kh Next value (new_Kh Next) by performing a keyed hash of the value in the input register 618 using a key comprised of the concatenation of the value in the Kh register 624 (which may be Kh_otp here) and another value in memory location 626 such as the device identifier (e.g., serial number) of the target device or portion thereof. The output of hardware hash block 610 (here the new_Kh Next value) is stored in hardware hash output register 612.

As discussed above, the "Write Kh Next" Sec_Op is configured such that the Kh Next value generated by the "Write Kh Next" Sec_Op based on that "Write Kh Next" AuthCode must be encrypted with the public key of the external service used to create that "Write Kh Next" AuthCode before the generated Kh Next value is exported. Thus, the public key associated with the service identifier for the external service or the "Write Kh Next" AuthCode (e.g., as located or provided by the external service) may be used to encrypt the generated Kh Next value (e.g., new_Kh next) in output register 612 (step 621) and the encrypted new_Kh Next value sent to the external service (step 623). The external service which initiated the "Write New Kh Next" command may then receive the encrypted new_Kh Next value sent from the target device and may decode the new_Kh Next value using the private key of the external service matching the public key with which the new_Kh Next value was encrypted.

At this point, if desired, any "Write Kh Next" AuthCodes for a Sec_Op of "Write Kh Next" command may be created for any dependent services as discussed. The generated Kh Next value (e.g., new_Kh next) in output register 612 (new_Kh Next) can then be written to the Kh Next register 620 (step 625). As the "Write Kh Next" command Sec_Op has now completed the target device may exit secure mode execution. This exit from secure mode causes the value stored in Kh Next register 620 (e.g., now new_Kh Next) to be written into Kh register 624 (if it is not in Kh register 624 already). This new_Kh Next value may be used by the external service to manage the target device, as the new_Kh Next value is contained in the Kh register 624 of the target device, allowing the external service to create AuthCodes for desired operations based on the new_Kh Next value, encode data using this value as a key for a symmetric encryption algorithm, or perform other operations on the target device that may require the knowledge of the value in the Kh register 624.

Figure 7:
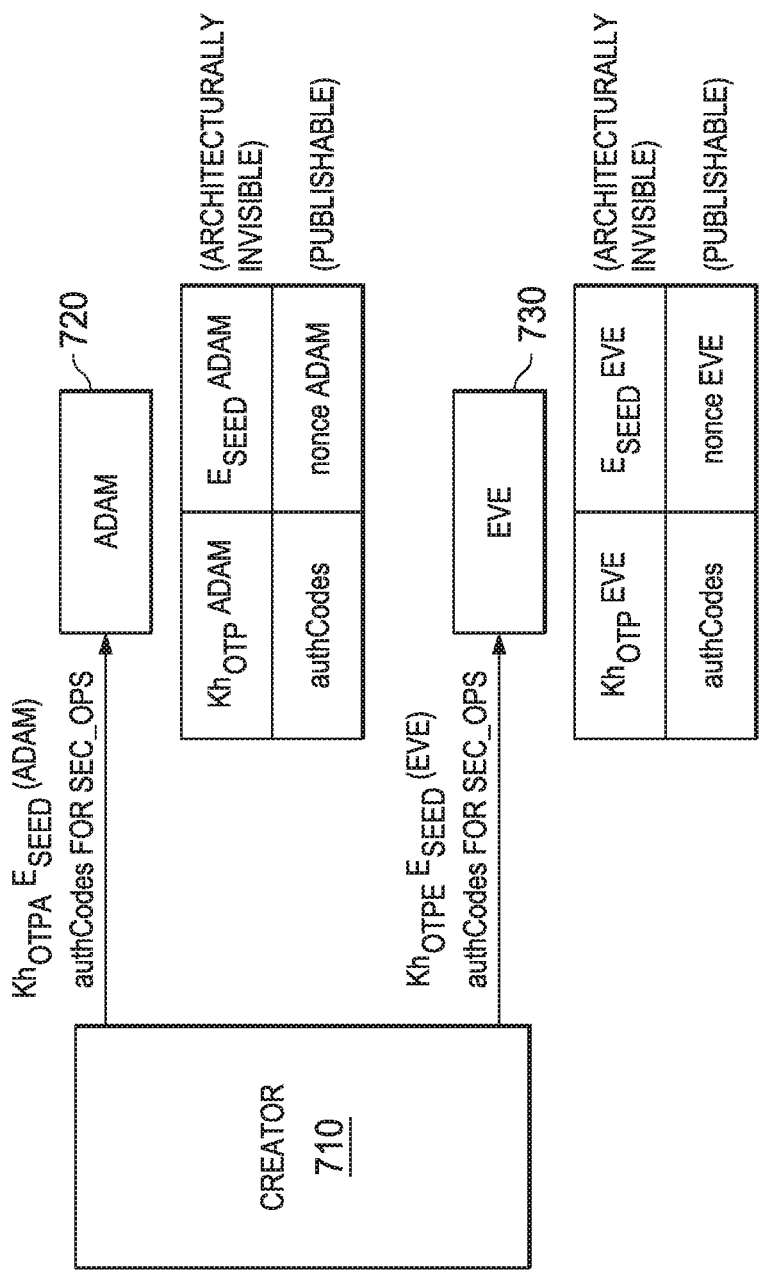
FIG. 7 is a block diagram illustrating one embodiment of an initialization process where two devices are initialized.

The architecture of these systems can be used to initialize target devices as discussed. In many instances, the external services (e.g., a CLA) may themselves be configured according to embodiments of architectures as described herein. Thus, these external services may themselves be initialized according to embodiments as depicted. FIG. 7 is a block diagram illustrating one example of an external service initialization process, where two devices, acting as external services, are initialized. As mentioned above, as many devices can be initialized as desired. FIG. 7 illustrates the initialization of a shared secret data encryption system with two external services. In this example, a creator device 710 is used to initialize a plurality of other devices. The system includes two or more other devices, as desired. As the number of devices increases, the resulting security of the system also increases. In the example shown in FIG. 7, two devices 720 and 730 are used. In this example, the device 720 is labeled as "Adam" and that the device 730 is labeled as "Eve". The creator device 710 creates two secrets, labeled as KhOTP_A (for Adam) and KhOTP_E (for Eve). At the same time, the creator device 710 creates two other random numbers (ESEED (for Adam) and ESEED (for Eve)) that are not associated in any way with random secrets KhOTP_A and KhOTP_E. KhOTP_A and KhOTP_E are used by the devices 720 and 730 as hardware secrets (KhOTP). The random numbers ESEED are used by the devices 720 and 730 as entropy seeds. The secrets KhOTP_A and KhOTP_E provided to the devices 720 and 730 are kept secret. The entropy seeds ESEED do not have to be secret.

The creator device 710 uses these generated numbers to create AuthCodes for the devices 720 and 730. For example, for each device 720 and 730, the creator device 710 may create three AuthCodes, Sec_Op 1, Sec_Op 2, and Sec_Op 3, for secure operations. The AuthCodes for each of the devices are based on the random numbers supplied to the devices. Sec_Op 1 is used by a respective device 720 or 730 to sign a message, which can be verified by the other device 720 or 730. In other words, Adam has to be able to sign a message in a way that Eve can verify that the message came from Adam. Sec_Op 2 is used by a respective device 720 or 730 to authenticate a message received from the other device 720 or 730. In other words, Eve has to be able to authenticate (on the device) that a message in fact came from Adam. Sec_Op 3 is used by a respective device 720 or 730 to generate an AuthCode for the other device 720 or 730. In other words, Adam has to be able to generate an AuthCode for Eve, and Eve has to be able to generate an AuthCode for Adam. However, Adam and Eve are not given the ability to create AuthCodes for themselves.

Once the creator device 710 generates the hardware secrets, seeds, and AuthCodes to Adam and Eve, the creator device 710 can be securely destroyed. The devices 720 and 730 can then be used by an encryption system to generate nonces for various devices in the system. Note that Adam and Eve do not know each other's secrets (KhOTP), or even their own secrets. Adam does not know his own secret, and the creator device doesn't supply Adam with an AuthCode to create an AuthCode for his own secret. Thus, in the example illustrated in FIG. 7, the devices 720 and 730 (e.g., Adam and Eve) may be cross-coupled to one another as they can each create AuthCodes for one another based on their knowledge of the AuthCodes for the various Sec_Ops (which were originally supplied by the creator device, prior to its destruction).

As mentioned above, as many devices can be initialized as desired using embodiments similar to those discussed with respect to FIG. 7. For example, instead of just two devices (e.g., devices 720 and 730 in FIG. 7), a system could initialize 100 devices. In that example, all 100 devices would have to be compromised to compromise the system. In the example of 100 devices, the threshold number may be as high as 99, since each device cannot sign for itself. In the example of FIG. 7 with two devices, the (maximum and minimum) threshold value is one. The threshold number may be set by policy and may be set up by the creator device of the system. In other words, if N is the size of the authentication set, N−1 is the maximum size of the authentication threshold. In the example of 100 devices, the threshold can be set to any number up to 99, for example 51. However, with a threshold of 51, for example, only 51 of the devices would need to be compromised to compromise the system. In the example of 100 devices and a threshold of 99, if one device is lost, the whole system will not work.

Therefore, when making a policy and setting a threshold number, numerous factors must be taken in consideration. Note that if one or more devices are lost, breaking the system, the existing target devices can continue to operate as they were previously authorized by the devices, but the system may not be able to issue any new AuthCodes. This concept may also be used to intentionally shut down a system. For example, with a system of four devices and a threshold of three, by securely deleting one device the whole system will be forced to halt, meaning new AuthCodes may never be issued (although the client devices can continue to operate as long as their existing AuthCodes do not expire). Embodiments as disclosed may be understood with respect to U.S. patent application Ser. No. 14/497,652, entitled "Systems and Method for Establishing and Using Distributed Key Servers" filed Sep. 26, 2014 by William V. Oxford, and U.S. patent application Ser. No. 14/683,988 entitled "System and Method for an Efficient Authentication and Key Exchange Protocol" filed Apr. 10, 2015 by William V. Oxford, which are all incorporated herein by reference in their entirety.

Figure 8:
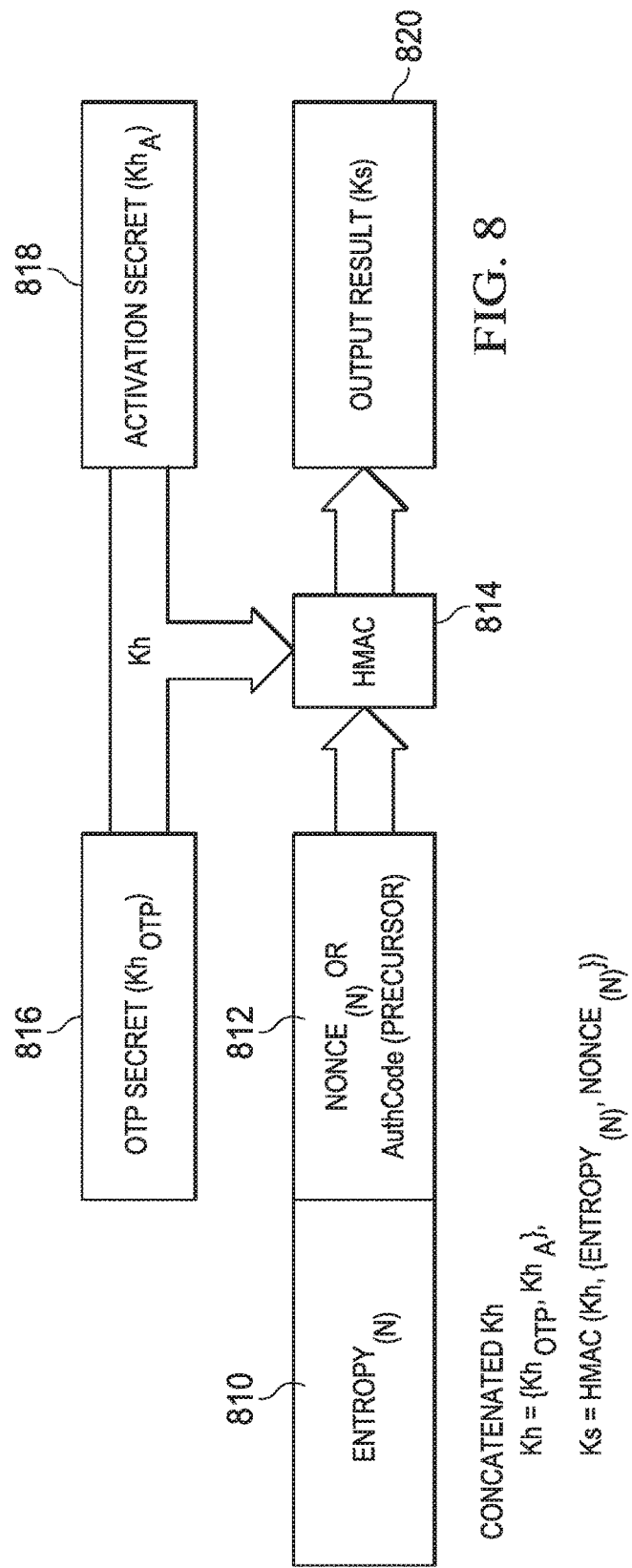
FIGS. 8-10 are block diagrams illustrating examples of generating secrets.

While certain embodiment have been described above using certain values to create secrets (e.g., Kh values, Kh_otp values, Kh Next values, etc.) for a target device, it will be realized that secrets for these target devices may be generated using other values and the use of such values in the generation of secrets are fully contemplated by embodiments herein. For example, FIG. 8 is a block diagram of a first example of generating a device secret. As shown, a source of entropy 810 may be concatenated with a nonce or AuthCode (a precursor) 812 and provided to hash function block (e.g., HMAC) 814. The hash function block 814 has a key input provided by the OTP secret (KhOTP) 816 and an activation secret (KhA) 818. The output 820 of the HMAC 814 may be a new secret Ks.

Figure 9:
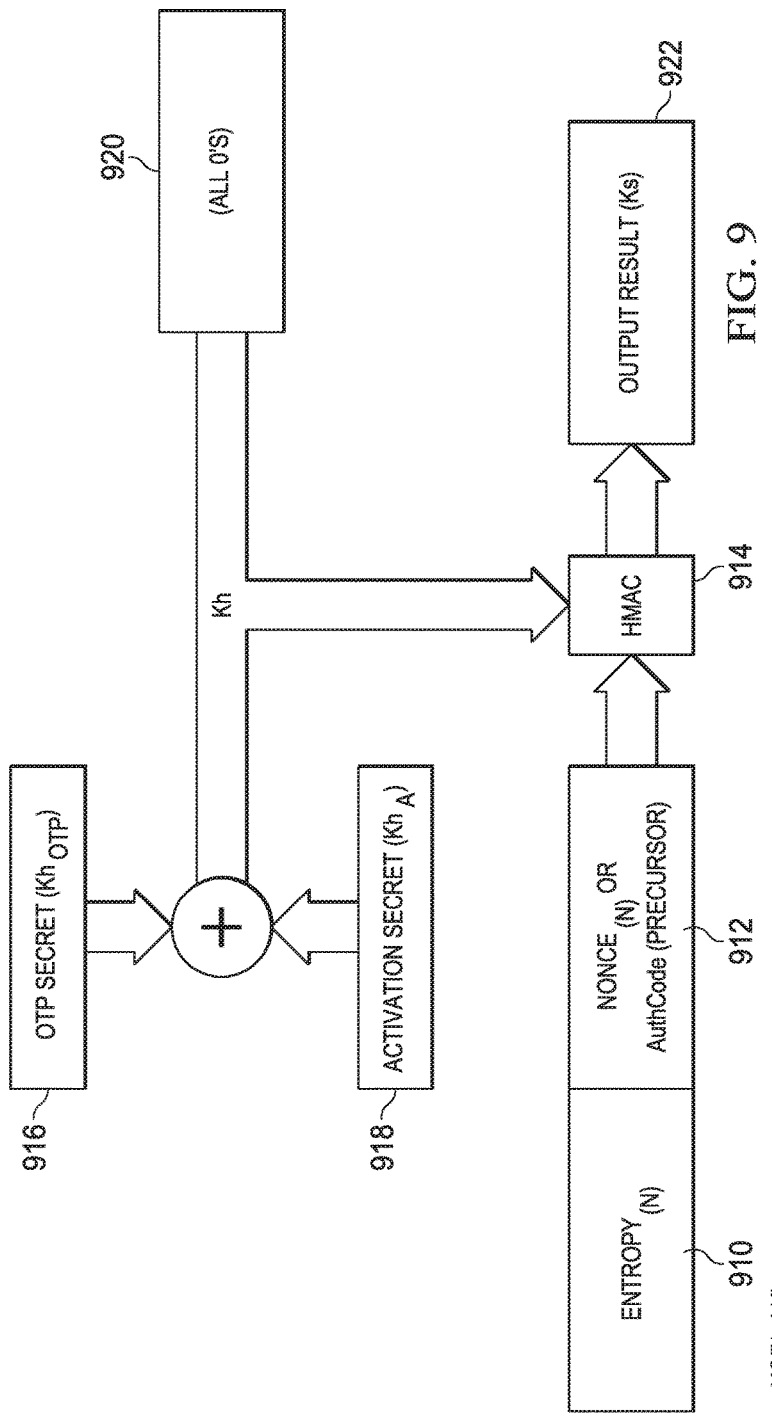

FIG. 9 is a block diagram of a second example of generating a device secret. As shown, a source of entropy 910 is concatenated with a nonce or AuthCode (a precursor) 912 and provided to hash function block (e.g., HMAC) 914. In this example, the key input (Kh) is derived from an exclusive OR (XOR) of the hardware secret (KhOTP) 916 and activation secret (KhA) 918, and a string value 920 (in FIG. 9, shown as 0's). The output 922 of the hash function block 914 may be a new secret Ks.

Figure 10:
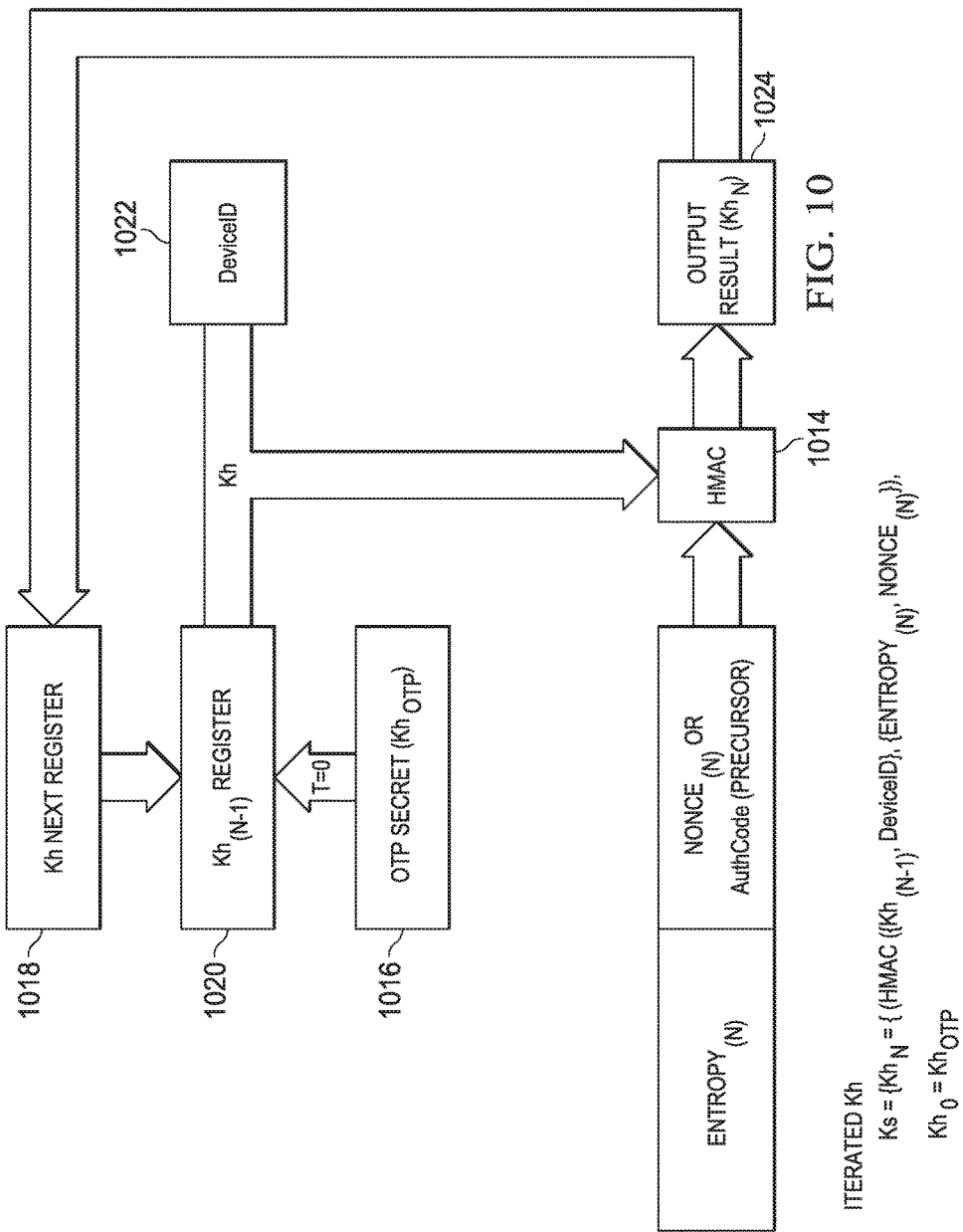

FIG. 10 is a block diagram of a third example of generating a device secret. FIG. 10 is similar to the example of FIG. 9, but with the key input (Kh) generated in a different manner. In this example, the key (Kh) is derived from a deviceID (or serial number) 1022 and the value of a Kh(N−1) register 1020. The value of a Kh(N−1) register 1020 is based on the hardware OTP secret (KhOTP) in Kh_otp register 1016 and the value in Kh Next register 1018. The output 1024 of the hash function block (e.g., HMAC) 1014 may be a new secret KhN, which is also used as the Kh Next register 1018 update input.

Although the invention has been described with respect to specific embodiments thereof, these embodiments are merely illustrative, and not restrictive of the invention. The description herein of illustrated embodiments of the invention, including the description in the Summary, is not intended to be exhaustive or to limit the invention to the precise forms disclosed herein (and in particular, the inclusion of any particular embodiment, feature or function within the Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein and throughout the claims that follow, the meaning of "in" includes "in" and "on" unless the context clearly dictates otherwise.

What is claimed is:

1. A system for registering a device with an external service using a shared secret comprising:
   a processing device;
   a keyed hash function block with a gated output;
   a secure execution controller configured to control the use of the keyed hash function block by enabling or disabling the use of the output of the keyed hash function block based on a logical union ("Boolean OR") of a plurality of conditions including a first condition based on a valid AuthCode comparison and a second condition based on a factory mode register;
   an unreadable first secret key register configured to store an immutable first secret value;
   a volatile second secret key register configured to be loaded with the first secret value when the device is reset; and
   at least one non-transitory computer-readable storage medium storing instructions translatable by the processing device to generate a shared secret for an external service and the device by:
      providing first input data as input to the keyed hash function block, the first input data including data associated with an external service;
      generating a shared secret associated with the device and the external service by applying the keyed hash function block to the input data using the first secret value or a derivative of the first secret value as a key to the keyed hash function block, wherein the shared secret is generated based on an AuthCode associated with the device and the external service and the AuthCode is generated with the factory mode register in a factory mode state by providing second input data as input to the keyed hash function block and applying the keyed hash function block to the second input data using a combination of the first secret value and an identifier for the device as a key to the keyed hash function block, the second input data comprising a combination of the public key of the external service and a command to generate the secret value;
      encrypting the shared secret with a public key of the external service;

sending the encrypted shared secret to the external service; and writing the shared secret to the second secret key register.

2. The system of claim 1, wherein the derivative value comprises a combination of the first secret value and an identifier of the device.

3. The system of claim 1, wherein the data associated with the external service comprises a first external entropy value.

4. The system of claim 3, wherein the first external entropy value includes the public key of the external service.

5. The system of claim 3, wherein the input data comprises a first internal entropy value.

6. The system of claim 5, wherein the first secret value was self-provisioned on the device by determining the first secret value based on the output of the keyed hash function block and writing the first secret value into the first secret key register on the device.

7. The system of claim 5, wherein the first secret value was pre-provisioned on the device.

8. The system of claim 6, wherein the first secret value was determined on the device by:

receiving a second external entropy value;

providing third input data as input to the keyed hash function block, the third input data including the second external entropy value and a second internal entropy value;

generating the first secret value by applying the keyed hash function block to the third input data using a combination of an initial value of the first secret key register and the identifier for the device as the key to the keyed hash function block; and writing the first secret value to the first secret key register such that the first secret value is immutable in the first secret key register.

9. The system of claim 8, wherein the shared secret is generated based on a valid AuthCode specific to the device and the external service, the AuthCode generated before the first secret value is written to the first secret key register by:

providing fourth input data as input to the keyed hash function block, the fourth input data comprising a combination of the public key of the external service and a command to generate the secret value;

generating the AuthCode associated with the device and the external service by applying the keyed hash function block to the fourth input data using a combination of the first secret value and the identifier for the device as a key to the keyed hash function block.

10. A method for registering a device with an external service using a shared secret comprising:

generating a shared secret for an external service and a device by:

providing first input data as input to a keyed hash function, the first input data including data associated with an external service, wherein an output of the keyed hash function is gated and a secure execution controller of the device is configured to enable or disable the use of the output of the keyed hash function block based on a logical union ("Boolean OR") of a plurality of conditions including a first condition based on a valid AuthCode comparison and a second condition based on a factory mode register;

generating a shared secret associated with the device and the external service by applying the keyed hash function to the input data using a first secret value or a derivative of the first secret value as a key to the keyed hash function, wherein the first secret value is an immutable value stored in an unreadable first secret key register, at least a portion of the derivative value or the first secret value is stored in a volatile second secret key register configured to be loaded with the first secret value when the device is reset, wherein the shared secret is generated based on an AuthCode associated with the device and the external service, and the AuthCode is generated with the factory mode register in a factory mode state by providing second input data as input to the keyed hash function block and applying the keyed hash function block to the second input data using a combination of the first secret value and an identifier for the device as a key to the keyed hash function block, the second input data comprising a combination of the public key of the external service and a command to generate the secret value;

encrypting the shared secret with a public key of the external service;

sending the encrypted shared secret to the external service; and writing the shared secret in the second secret key register.

11. The method of claim 10, wherein the derivative value comprises a combination of the first secret value and an identifier of the device.

12. The method of claim 10, wherein the data associated with the external service comprises a first external entropy value.

13. The method of claim 12, wherein the first external entropy value includes the public key of the external service.

14. The method of claim 12, wherein the input data comprises a first internal entropy value.

15. The method of claim 14, wherein the first secret value was self-provisioned on the device by determining the first secret value based on an output of the keyed hash function and writing the first secret value into the first secret key register on the device.

16. The method of claim 14, wherein the first secret value was pre-provisioned on the device.

17. The method of claim 15, wherein the first secret value was determined on the device by:

receiving a second external entropy value;

providing third input data as input to the keyed hash function, the third input data including the second external entropy value and a second internal entropy value;

generating the first secret value by applying the keyed hash function to the third input data using a combination of an initial value of the first secret key register and the identifier for the device as the key to the keyed hash function; and writing the first secret value to the first secret key register such that the first secret value is immutable in the first secret key register.

18. The method of claim 17, wherein the shared secret is generated based on an AuthCode specific to the device and the external service, the AuthCode generated before the first secret value is written to the first secret key register by:

providing fourth input data as input to the keyed hash function, the fourth input data comprising a combination of the public key of the external service and a command to generate the secret value;

generating the AuthCode associated with the device and the external service by applying the keyed hash function to the fourth input data using a combination of the first secret value and the identifier for the device as a key to the hash function.

* * * * *